United States Patent
Griot et al.

(10) Patent No.: US 12,279,339 B2
(45) Date of Patent: Apr. 15, 2025

(54) SERVICE GROUPS IN A SERVICE-BASED WIRELESS SYSTEM

(71) Applicant: QUALCOMM Incorporated, San Diego, CA (US)

(72) Inventors: Miguel Griot, La Jolla, CA (US); Aziz Gholmieh, Del Mar, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/948,086

(22) Filed: Sep. 19, 2022

(65) Prior Publication Data
US 2024/0098479 A1    Mar. 21, 2024

(51) Int. Cl.
    *H04W 8/18*      (2009.01)
    *H04W 4/50*      (2018.01)
    *H04W 12/08*     (2021.01)

(52) U.S. Cl.
    CPC ............ *H04W 8/186* (2013.01); *H04W 4/50* (2018.02); *H04W 12/08* (2013.01)

(58) Field of Classification Search
CPC ........ H04W 8/186; H04W 4/50; H04W 12/08
USPC ...................................... 455/414.1
See application file for complete search history.

(56) References Cited

U.S. PATENT DOCUMENTS

| | | | | |
|---|---|---|---|---|
| 7,783,777 | B1* | 8/2010 | Pabla | G06F 16/1834 709/239 |
| 2003/0119452 | A1* | 6/2003 | Kim | H04W 52/146 455/69 |
| 2016/0234198 | A1* | 8/2016 | Breiman | H04L 67/141 |
| 2018/0324204 | A1* | 11/2018 | McClory | G06F 9/5027 |

(Continued)

FOREIGN PATENT DOCUMENTS

WO    WO-2020033086 A1    2/2020

OTHER PUBLICATIONS

Intel: "5G Security Aspects", 3GPP TSG SA WG2 Meeting #118bis, S2-170146, 3rd Generation Partnership Project, Mobile Competence Centre, 650, Route Des Lucioles, F-06921 Sophia-Antipolis Cedex, France, vol. SA WG2, No. Spokane, USA, Jan. 16, 2017-Jan. 20, 2017, pp. 1-2, Jan. 10, 2017, XP051205588, The Whole Document.

(Continued)

*Primary Examiner* — Mark G. Pannell
(74) *Attorney, Agent, or Firm* — Holland & Hart LLP

(57) ABSTRACT

Methods, systems, and devices for wireless communications are described. In a service-based network, groups of core network services may share a user equipment (UE) credential or network subscription. Signaling between a UE and a service-based network (e.g., via a distributed unit) enables the UE to establish a service context for communications with multiple core network services in a same service group. A UE may receive control signaling from the network indicating service groups offered by the service-based net- (Continued)

work. The control signaling may indicate the services included in each service group and how to access the service group. The UE may transmit an access request indicating a selected service group to the network, and in response, the network may indicate a service context for communicating with the services included in the service group. The UE may use the same service context to access the different services in the service group.

30 Claims, 18 Drawing Sheets

(56) References Cited

U.S. PATENT DOCUMENTS

| | | | |
|---|---|---|---|
| 2020/0280562 A1* | 9/2020 | Salkintzis | H04L 65/612 |
| 2022/0116335 A1 | 4/2022 | Sharma Banjade et al. | |
| 2022/0132313 A1 | 4/2022 | Lee et al. | |
| 2022/0232423 A1 | 7/2022 | Thyagaturu et al. | |
| 2023/0396655 A1* | 12/2023 | Rodrigo | H04W 12/72 |
| 2024/0073212 A1* | 2/2024 | Wu | H04L 67/56 |

OTHER PUBLICATIONS

International Search Report and Written Opinion—PCT/US2023/073193—ISA/EPO—Dec. 1, 2023.

* cited by examiner

SERVICE GROUPS IN A SERVICE-BASED WIRELESS SYSTEM

FIELD OF TECHNOLOGY

The following relates to wireless communications, including service groups in a service-based wireless system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, fifth generation (5G) systems which may be referred to as New Radio (NR) systems, and sixth generation (6G) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a radio access network (RAN) that supports wireless communication for communication devices, which may be known as user equipment (UE).

SUMMARY

The described techniques relate to improved methods, systems, devices, and apparatuses that support service groups in a service-based wireless system. For example, the described techniques provide for indications of and communications with service groups in a service-based network. In a service-based network, groups of core network services (e.g., service groups) may share a user equipment (UE) credential or network subscription (e.g., may be accessed via a same UE credential or network subscription). For example, a single network operator may provide multiple service groups associated with multiple UE credentials, or multiple operators may provide multiple service groups, each associated with respective credentials. A UE may establish wireless connections with service groups in a service-based network. Signaling between a UE and a service-based network (e.g., via a distributed unit (DU)) enables the UE to establish a service context for communications with multiple core network services in a same service group. For example, a service context may be a security context (e.g., authentication information or a key agreement) or a network subscription. For example, a UE may establish a connection with a service-based network via a DU and receive control signaling from the service-based network via the DU indicating a set of multiple service groups offered by the network. The control signaling may indicate the core network services included in each service group and how to access the service group (e.g., a credential or network subscription to use to access the service group). The UE may transmit an access request indicating a selected service group to the network, and in response, the network may indicate a service context for communicating with the core network services included in the service group. For example, the service context may be a master security context, from which security contexts for each of the core network services in the service group may be derived. Accordingly, the UE may use the same service context to access the different core network services in the service group.

A method for wireless communication at a UE is described. The method may include identifying first control information indicating a set of multiple service groups offered by a service-based network configured to interface with a radio access network (RAN) associated with a DU, where the first control information indicates, for each service group of the set of multiple service groups, a respective set of core network services included in the service group and a respective network credential for accessing the service group, transmitting, in response to the first control information, an access request indicating a first service group of the set of multiple service groups and the respective network credential for the first service group, receiving, in response to the access request, second control information indicating a service context for communicating with the respective set of core network services for the first service group, and communicating, in accordance with the service context, a message with a core network service of the respective set of core network services for the first service group.

An apparatus for wireless communication at a UE is described. The apparatus may include a processor, memory coupled with the processor, and instructions stored in the memory. The instructions may be executable by the processor to cause the apparatus to identify first control information indicating a set of multiple service groups offered by a service-based network configured to interface with a radio access network (RAN) associated with a DU, where the first control information indicates, for each service group of the set of multiple service groups, a respective set of core network services included in the service group and a respective network credential for accessing the service group, transmit, in response to the first control information, an access request indicating a first service group of the set of multiple service groups and the respective network credential for the first service group, receive, in response to the access request, second control information indicating a service context for communicating with the respective set of core network services for the first service group, and communicate, in accordance with the service context, a message with a core network service of the respective set of core network services for the first service group.

Another apparatus for wireless communication at a UE is described. The apparatus may include means for identifying first control information indicating a set of multiple service groups offered by a service-based network configured to interface with a RAN associated with a DU, where the first control information indicates, for each service group of the set of multiple service groups, a respective set of core network services included in the service group and a respective network credential for accessing the service group, means for transmitting, in response to the first control information, an access request indicating a first service group of the set of multiple service groups and the respective network credential for the first service group, means for receiving, in response to the access request, second control information indicating a service context for communicating with the respective set of core network services for the first service group, and means for communicating, in accordance with the service context, a message with a core network service of the respective set of core network services for the first service group.

A non-transitory computer-readable medium storing code for wireless communication at a UE is described. The code may include instructions executable by a processor to identify first control information indicating a set of multiple service groups offered by a service-based network configured to interface with a RAN associated with a DU, where the first control information indicates, for each service group of the set of multiple service groups, a respective set of core network services included in the service group and a respective network credential for accessing the service group, transmit, in response to the first control information, an access request indicating a first service group of the set of multiple service groups and the respective network credential for the first service group, receive, in response to the access request, second control information indicating a service context for communicating with the respective set of core network services for the first service group, and communicate, in accordance with the service context, a message with a core network service of the respective set of core network services for the first service group.

In some examples of the method, apparatuses, and non-transitory computer-readable medium described herein, the service context includes a master security context associated with the first service group and the method, apparatuses, and non-transitory computer-readable medium may include further operations, features, means, or instructions for determining a respective security context for each core network service included in the first service group based on the master security context.

In some examples of the method, apparatuses, and non-transitory computer-readable medium described herein, communicating the message in accordance with the service context may include operations, features, means, or instructions for communicating the message in accordance with the determined respective security context for the core network service.

In some examples of the method, apparatuses, and non-transitory computer-readable medium described herein, the master security context includes authentication information, a key agreement, or both.

Some examples of the method, apparatuses, and non-transitory computer-readable medium described herein may further include operations, features, means, or instructions for communicating, in accordance with the service context, a second message with a second core network service of the respective set of core network services.

In some examples of the method, apparatuses, and non-transitory computer-readable medium described herein, the core network service may be configured to invoke a second core network service included in the first service group based on the message being communicated with the core network service.

In some examples of the method, apparatuses, and non-transitory computer-readable medium described herein, the core network service includes a data service and the second core network service includes a mobility service.

Some examples of the method, apparatuses, and non-transitory computer-readable medium described herein may further include operations, features, means, or instructions for transmitting, in response to the first control information, a second access request indicating a second service group of the set of multiple service groups and the respective network credential for the second service group, receiving, in response to the second access request, third control information indicating a second service context for communicating with the respective set of core network services for the second service group, and communicating, in accordance with the second service context, a second message with a second core network service of the respective set of core network services included in the second service group.

In some examples of the method, apparatuses, and non-transitory computer-readable medium described herein, the second core network service may be configured to invoke a third core network service included in the first service group based on the second message being communicated with the second core network service.

In some examples of the method, apparatuses, and non-transitory computer-readable medium described herein, the second core network service includes a data service and the third core network service includes a mobility service.

In some examples of the method, apparatuses, and non-transitory computer-readable medium described herein, identifying the first control information may include operations, features, means, or instructions for determining that the first service group does not communicate with the second service group, where transmitting the second access request may be based on the determining that the first service group does not communicate with the second service group.

In some examples of the method, apparatuses, and non-transitory computer-readable medium described herein, identifying the first control information may include operations, features, means, or instructions for identifying whether each service group of the set of multiple service groups may be capable of communication with one or more other service groups of the set of multiple service groups.

In some examples of the method, apparatuses, and non-transitory computer-readable medium described herein, identifying the first control information may include operations, features, means, or instructions for identifying a respective network subscription associated with each of the set of multiple service groups, where transmitting the access request may be based on the respective network subscription associated with the first service group.

In some examples of the method, apparatuses, and non-transitory computer-readable medium described herein, the service context includes a radio access network configuration for communicating with the DU as part of using the core network service.

In some examples of the method, apparatuses, and non-transitory computer-readable medium described herein, the access request, the message, or both, may be transmitted to the DU for relay to a network address associated with the core network service.

In some examples of the method, apparatuses, and non-transitory computer-readable medium described herein, each core network service of the respective set of core network services may be associated with a respective application programming interface of a set of multiple application programming interfaces.

In some examples of the method, apparatuses, and non-transitory computer-readable medium described herein, the respective set of core network services include a mobility service, a connection state management service, a security service, a paging service, a radio access service, a data service, a capability management service, a location service, a messaging service, or any combination thereof.

In some examples of the method, apparatuses, and non-transitory computer-readable medium described herein, identifying the first control information may include operations, features, means, or instructions for receiving the first control information via a wireless connection between the UE and the DU.

In some examples of the method, apparatuses, and non-transitory computer-readable medium described herein, identifying the first control information may include operations, features, means, or instructions for accessing the first control information from local storage at the UE.

A method for wireless communications at a DU is described. The method may include receiving, from a UE, an access request indicating a first service group of a set of multiple service groups offered by a service-based network configured to interface with a RAN associated with the DU, where each service group of the set of multiple service groups includes a respective set of core network services, where each service group of the set of multiple service groups is associated with a respective network credential for accessing the service group, and where the access request further indicates the respective network credential for the first service group, transmitting, to the UE and in response to the access request, control information indicating a service context for communications between the UE and the respective set of core network services for the first service group, and communicating a message received from the UE in accordance with the service context to a core network service of the respective set of core network services for the first service group.

An apparatus for wireless communications at a DU is described. The apparatus may include a processor, memory coupled with the processor, and instructions stored in the memory. The instructions may be executable by the processor to cause the apparatus to receive, from a UE, an access request indicating a first service group of a set of multiple service groups offered by a service-based network configured to interface with a RAN associated with the DU, where each service group of the set of multiple service groups includes a respective set of core network services, where each service group of the set of multiple service groups is associated with a respective network credential for accessing the service group, and where the access request further indicates the respective network credential for the first service group, transmit, to the UE and in response to the access request, control information indicating a service context for communications between the UE and the respective set of core network services for the first service group, and communicate a message received from the UE in accordance with the service context to a core network service of the respective set of core network services for the first service group.

Another apparatus for wireless communications at a DU is described. The apparatus may include means for receiving, from a UE, an access request indicating a first service group of a set of multiple service groups offered by a service-based network configured to interface with a RAN associated with the DU, where each service group of the set of multiple service groups includes a respective set of core network services, where each service group of the set of multiple service groups is associated with a respective network credential for accessing the service group, and where the access request further indicates the respective network credential for the first service group, means for transmitting, to the UE and in response to the access request, control information indicating a service context for communications between the UE and the respective set of core network services for the first service group, and means for communicating a message received from the UE in accordance with the service context to a core network service of the respective set of core network services for the first service group.

A non-transitory computer-readable medium storing code for wireless communications at a DU is described. The code may include instructions executable by a processor to receive, from a UE, an access request indicating a first service group of a set of multiple service groups offered by a service-based network configured to interface with a RAN associated with the DU, where each service group of the set of multiple service groups includes a respective set of core network services, where each service group of the set of multiple service groups is associated with a respective network credential for accessing the service group, and where the access request further indicates the respective network credential for the first service group, transmit, to the UE and in response to the access request, control information indicating a service context for communications between the UE and the respective set of core network services for the first service group, and communicate a message received from the UE in accordance with the service context to a core network service of the respective set of core network services for the first service group.

In some examples of the method, apparatuses, and non-transitory computer-readable medium described herein, the service context includes a master security context associated with the first service group and a respective security context for each core network service included in the first service group may be based on the master security context.

In some examples of the method, apparatuses, and non-transitory computer-readable medium described herein, the master security context includes authentication information, a key agreement, or both.

In some examples of the method, apparatuses, and non-transitory computer-readable medium described herein, communicating the message in accordance with the service context may include operations, features, means, or instructions for communicating the message in accordance with the respective security context for the core network service.

Some examples of the method, apparatuses, and non-transitory computer-readable medium described herein may further include operations, features, means, or instructions for communicating a second message received from the UE in accordance with the service context to a second core network service of the respective set of core network services.

In some examples of the method, apparatuses, and non-transitory computer-readable medium described herein, the core network service may be configured to invoke a second core network service included in the first service group based on the message being communicated to the core network service.

In some examples of the method, apparatuses, and non-transitory computer-readable medium described herein, the core network service includes a data service and the second core network service includes a mobility service.

Some examples of the method, apparatuses, and non-transitory computer-readable medium described herein may further include operations, features, means, or instructions for receiving, from the UE, a second access request indicating a second service group of the set of multiple service groups and the respective network credential for the second service group, transmitting, to the UE and in response to the second access request, second control information indicating a second service context for communicating with the respective set of core network services for the second service group, and communicating a second message received from the UE in accordance with the second service context to a second core network service of the respective set of core network services included in the second service group.

In some examples of the method, apparatuses, and non-transitory computer-readable medium described herein, the second core network service may be configured to invoke a third core network service included in the first service group based on the second message being communicated to the second core network service.

In some examples of the method, apparatuses, and non-transitory computer-readable medium described herein, the second core network service includes a data service, and the third core network service includes a mobility service.

In some examples of the method, apparatuses, and non-transitory computer-readable medium described herein, the first service group does not communicate with the second service group.

Some examples of the method, apparatuses, and non-transitory computer-readable medium described herein may further include operations, features, means, or instructions for transmitting, to the UE, second control information indicating the set of multiple service groups, where the second control information indicates, for each service group of the set of multiple service groups, the respective set of core network services included in the service group and the respective network credential for accessing the service group.

In some examples of the method, apparatuses, and non-transitory computer-readable medium described herein, transmitting the second control information may include operations, features, means, or instructions for transmitting an indication of whether each service group of the set of multiple service groups may be capable of communication with one or more other service groups of the set of multiple service groups.

In some examples of the method, apparatuses, and non-transitory computer-readable medium described herein, transmitting the second control information may include operations, features, means, or instructions for transmitting an indication of a respective network subscription associated with each of the set of multiple service groups, where receiving the access request may be based on the respective network subscription associated with the first service group.

In some examples of the method, apparatuses, and non-transitory computer-readable medium described herein, the service context includes a radio access network configuration for communicating with the UE as part of using the core network service.

In some examples of the method, apparatuses, and non-transitory computer-readable medium described herein, each core network service of the respective set of core network services may be associated with a respective application programming interface of a set of multiple application programming interfaces.

In some examples of the method, apparatuses, and non-transitory computer-readable medium described herein, the respective set of core network services include a mobility service, a connection state management service, a security service, a paging service, a radio access service, a data service, a capability management service, a location service, a messaging service, or any combination thereof.

DETAILED DESCRIPTION

Figure 1:
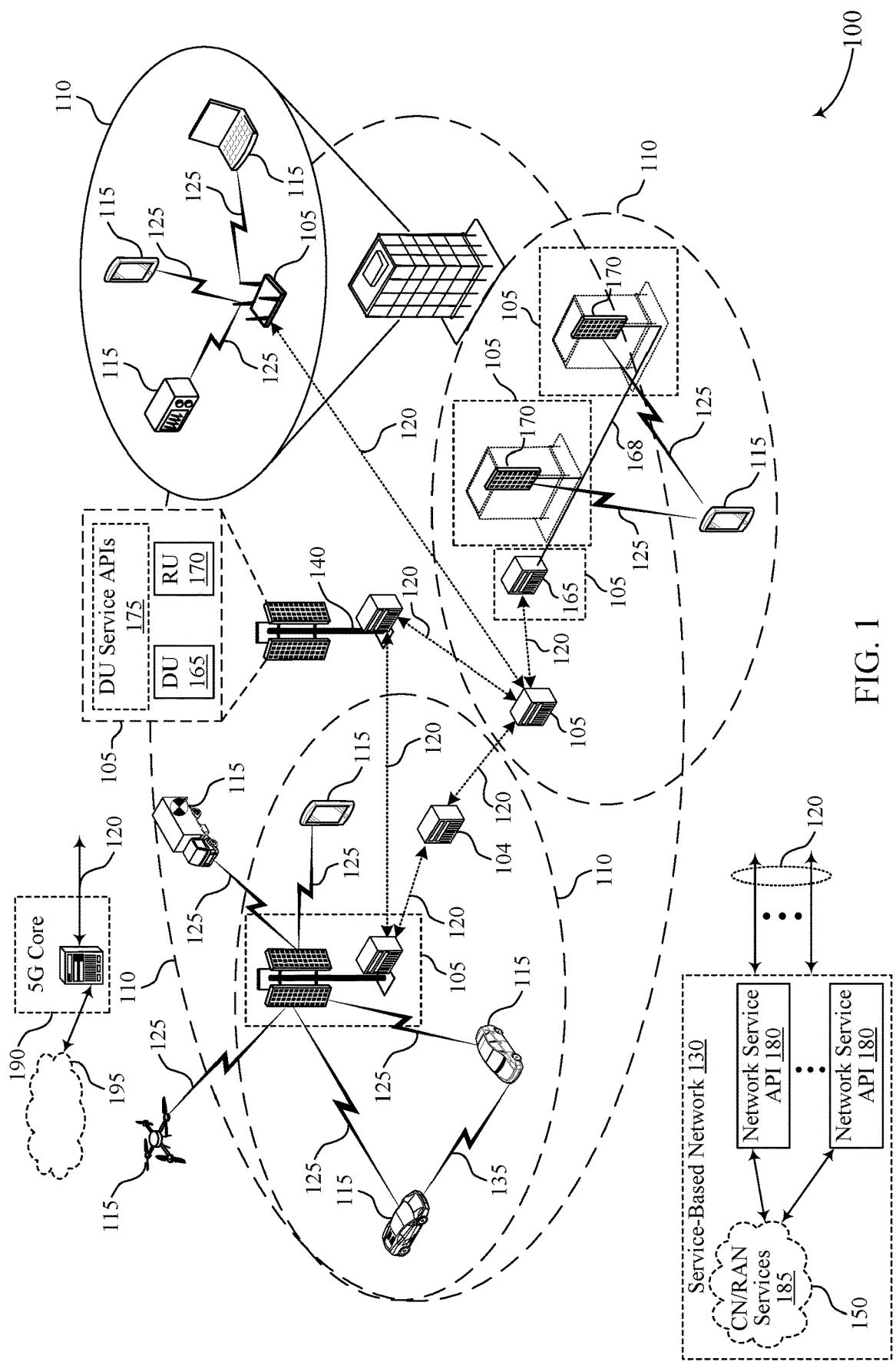
FIG. 1 illustrates an example of a wireless communications system that supports service groups in a service-based wireless system in accordance with one or more aspects of the present disclosure.

Some wireless systems may exhibit a relatively vertical, hierarchical architecture that includes many "layers" of different devices that perform functions for the system. For example, a wireless system may include user equipments (UEs), base stations/network entities, and numerous back-end (e.g., core network) devices associated with one or more functions for the system. Such a hierarchical structure may result in processing and other functions being performed at multiple devices (e.g., duplicative processing or capabilities across multiple back-end devices), thereby leading to wasted resources and excess power consumption. Additionally, the back-end architecture of some wireless systems may be owned and maintained by a small handful of operators, which may make it difficult for other parties/entities to integrate with the systems and may complicate the ability of the systems to offer customized services and functionality to wireless devices.

Comparatively, some wireless systems, such as Sixth Generation (6G) systems, may exhibit a flatter, service-based architecture in which a radio access network (RAN) (e.g., network entities) interfaces with a service-based network in order to connect UEs to core network services maintained at various network addresses within the service-based network. In the context of a service-based system, operations and functions that may otherwise be performed by a few centralized back-end components (e.g., in some systems) may be distributed across a number of core network services that may be hosted at different network addresses, such as in a cloud-based architecture. As a result, UEs in a service-based system may be able to establish and maintain connections with (e.g., "subscribe" to) different core network services or groups thereof on an a la carte basis, where each core network service offers or provides a respective network functionality or service. For example, a service-based system may include a mobility service, a security service, a privacy service, a location service, and the like. In this regard, each UE within a service-based system may be able to select to which core network services the UE will subscribe based on the individualized characteristics or needs of the respective UE.

In some examples, groups of core network services (e.g., service groups) may share a UE credential or network subscription (e.g., may be accessed via a same UE credential or network subscription). For example, a single network operator may provide multiple service groups associated with multiple UE credentials, or multiple operators may provide multiple service groups, each associated with respective credentials. In contrast, in some systems, an entire operator system may be grouped, and slicing may be used to support one type of traffic at the internet protocol (IP) layer. Additionally or alternatively, in some systems, network services provided by slicing may be defined above layer 2 (e.g., in radio link control (RLC)).

In some examples as described herein, each service group may include a set of multiple core network services. A UE may establish wireless connections with service groups in a service-based network. Signaling between a UE and a service-based network (e.g., via a distributed unit (DU)) enables the UE to establish a service context for communications with multiple core network services in a same service group. For example, a service context may be a security context (e.g., authentication information or a key agreement) or a network subscription.

For example, a UE may establish a connection with a service-based network via a DU and receive control signaling from the service-based network via the DU indicating a set of multiple service groups offered by the service-based network. The control signaling may indicate the core network services included in each service group and how to access the service group (e.g., a credential or network subscription to use to access the service group). The UE may transmit an access request indicating a selected service group to the network, and in response, the network may indicate a service context for communicating with the core network services included in the service group. For example, the service context may be a master security context, from which security contexts for each of the core network services in the service group may be derived. Accordingly, the UE may use the same service context to access the different core network services in the service group. Core network services within a group be dependent on other core network services in the group (e.g., a data service may depend on a mobility service). Accordingly, one communications with one core network service may involve communicating with (e.g., automatically) other services in the same group.

Aspects of the disclosure are initially described in the context of wireless communications systems. Aspects of the disclosure are further illustrated by and described with reference to system diagrams, process flows, apparatus diagrams, system diagrams, and flowcharts that relate to service groups in a service-based wireless system.

FIG. 1 illustrates an example of a wireless communications system 100 that supports service groups in a service-based wireless system in accordance with one or more aspects of the present disclosure. The wireless communications system 100 may include one or more network entities 105, one or more UEs 115, and a service-based network 130. In some examples, the wireless communications system 100 may implement aspects of a 6G network, a 5G network (e.g., a New Radio (NR) network), a 4G network (e.g., a Long Term Evolution (LTE) network, an LTE-Advanced (LTE-A) network, an LTE-A Pro network), or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a RAN node, access point, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the service-based network 130, or with one another, or both. For example, network entities 105 may communicate with the service-based network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a service-based network 130). In some examples, network entities 105 may communicate with one another via one or more communication links such as a fronthaul communication link 168 (e.g., between a radio unit 170 and a DU 165). The backhaul communication links 120 or fronthaul communication links 168, or other communication links between network entities 105, may be or include one or more wired links (e.g., an electrical link, an optical fiber link), one or more wireless links (e.g., a radio link, a wireless optical link), among other examples or various combinations thereof.

In some examples, network entities 105 may communicate with a service platform 150 (e.g., a cloud platform) that provides one or more core network services (CN services), one or more radio access network services (RAN services), or any combinations thereof (CN/RAN services 185). The CN/RAN services may be provided via the service-based network 130, using one or more application programming interfaces (APIs). For example, one or more DU service APIs 175 may provide an interface for one or more services at a UE 115. The services at the UE 115 may correspond to one or more CN/RAN services 185 at service platform 150. For example, network service APIs 180 at service-based network 130 may interface with corresponding DU service APIs 175 at a DU 165, which interface with corresponding APIs at a UE 115 to provide service connectivity between the one or more UE 115 services and corresponding CN/RAN services 185. In some cases, a common API framework may be defined for both CN/RAN services 185 and UEs 115. CN/RAN services 185 may be restricted to be available only to UEs 115 or only to other network services based on authorizations.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, a 6G NB, or other suitable terminology). In some examples, a network entity 105 (e.g., a base station 140) may be implemented in an aggregated (e.g., monolithic, standalone) base station architecture, which may be configured to utilize a service-based architecture and provide radio access within a single network entity 105 (e.g., a single RAN node, such as a base station 140, may include a RU 170, a DU 165, and DU APIs 175 for CN/RAN services 185). An RU 170 may also be referred to as a radio head, a smart radio head, a remote radio head (RRH), a remote radio unit (RRU), or a transmission reception point (TRP).

Additionally, in some examples, one or more network entities 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), a DU 165, RU 170, a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between components (e.g., CU, DU, and RU) is flexible and may support different functionalities depending on which functions (e.g., network layer functions, protocol layer functions, baseband functions, RF functions, and any combinations thereof) are performed at a component. For example, a functional split of a protocol stack may be employed between a CU and a DU 165 such that the CU may support one or more layers of the protocol stack and the DU 165 may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). In some examples, the CU may host one or more service APIs for one or more CN/RAN services 185 via corresponding network service APIs 180 of service-based network 130. The CU may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU and a DU 165, or between a DU 165 and an RU 170 may be within a protocol layer (e.g., some functions for a protocol layer may be performed by one of a CU, a DU 165, or an RU 170, while other functions of the protocol layer are performed by a different one of the CU, the DU 165, or the RU 170). A DU 165 may be connected to one or more RUs 170 via a fronthaul communication link 168 (e.g., open fronthaul (FH) interface). In some examples, a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a service-based network 130). In some cases, in an IAB network, one or more network entities 105 (e.g., IAB nodes 104) may be partially controlled by each other. One or more IAB nodes 104 may be referred to as a donor entity or an IAB donor.

One or more DUs 165 or one or more RUs 170 may be partially controlled by a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for capability indication to multiple services in a service-based wireless system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs, RUs 170, RIC, SMO).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., 4G, 5G, 6G radio access technology). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In examples of the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

In some deployments, multiple RANs may be accessed by one or more UEs 115 or network entities 105 such as, for example, a 6G RAT and a 5G RAT. In some examples, the 6G RAT may be associated with service-based network 130 and the 5G RAT may be associated with a 5G core 190. The 5G core 190 may provide user authentication, access authorization, tracking, Internet Protocol (IP) connectivity, and other access, routing, or mobility functions. The 5G core 190 may be an evolved packet core (EPC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the 5G core 190. User IP packets may be transferred through the user plane entity, which may provide IP address allocation as well as other functions. The user plane entity may be connected to IP services 195 for one or more network operators. The IP services 195 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may include a packet-based network that operates using a cloud platform, such as service platform 150, that provides CN/RAN services 185. The CN/RAN services 185, in some examples, may be hosted based on a deployment topology and capabilities for service parameters associated with each service. Providing CN/RAN services 185 allows for separation of particular services (e.g., mobility, connection state management, security, paging, radio access services, quality of service (QoS) configuration and data services, UE capability management, location, messaging, among others) from transport functions (e.g., data radio bearer (DRB) and logical channel (LC) management, data service configuration, among others). Service-based functions (e.g., a message broker decouple radio network procedures from network delivery mechanisms) may allow for flexibility of some functions (e.g., layer 2 (L2) functions) to be hosted anywhere in the cloud, and may enable enhanced scalability, resiliency, elasticity, agility, reuse, visibility, automation, failover, or any combinations thereof (e.g., each service across RAN and core network may scale independently by increasing or decreasing resources allocated across functions independently). Further, efficiency may be enhanced through providing real-time link management to the RAN edge and by allowing for adaptation at the DU 165 for more efficient activation, deactivation, or selection of features based on UE conditions.

Figure 2:
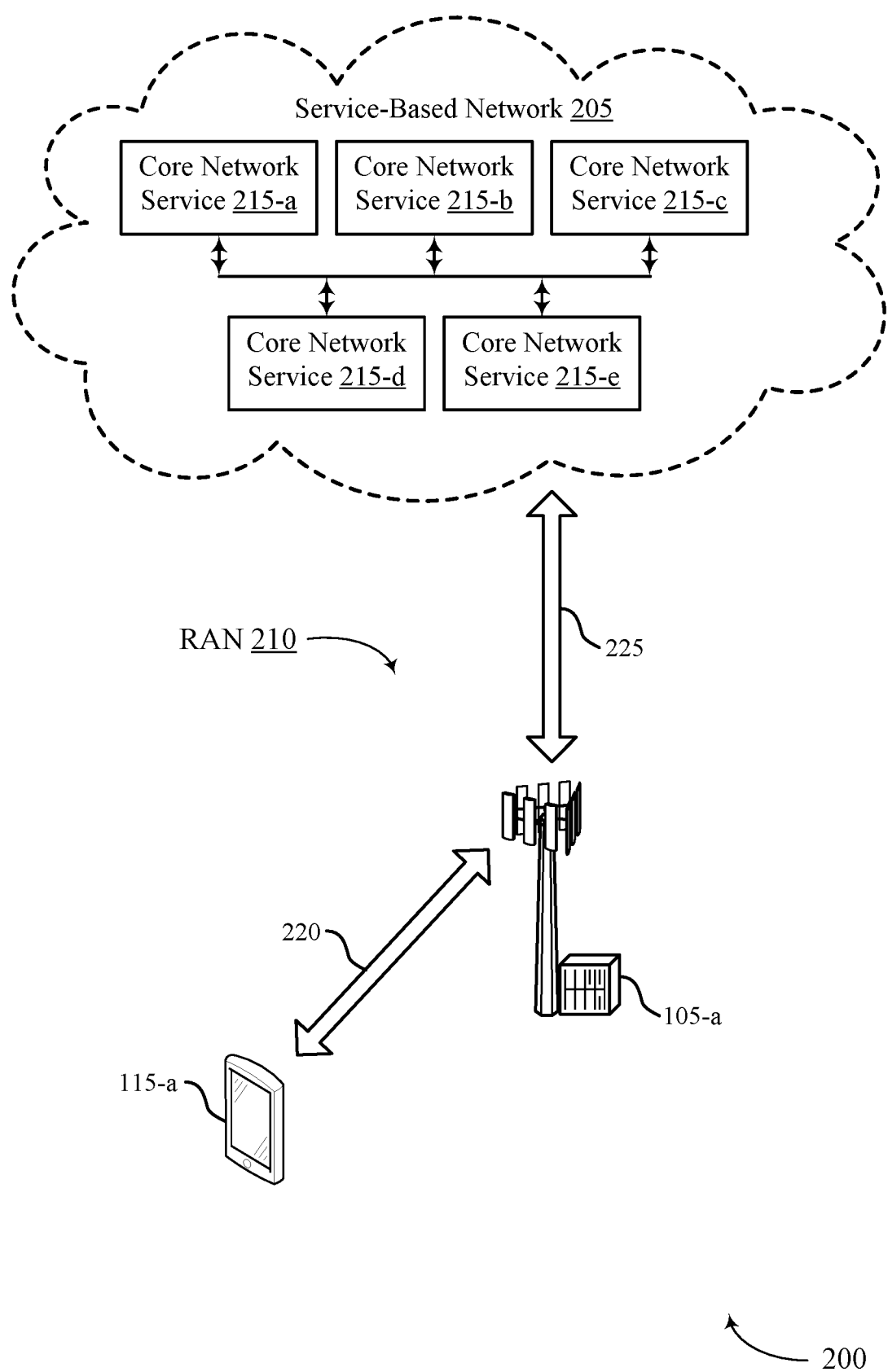
FIG. 2 illustrates an example of a wireless communications system that supports service groups in a service-based wireless system in accordance with one or more aspects of the present disclosure.

FIG. 2 illustrates an example of a wireless communications system 200 that supports service groups in a service-based wireless system in accordance with one or more aspects of the present disclosure. Aspects of the wireless communications system 200 may implement, or be implemented by, aspects of the wireless communications system 100. In some implementations, the wireless communications system 200 illustrates an example architecture of a service-based wireless communications system, such as a system as described with reference to FIG. 1.

The wireless communications system 200 may include one or more UEs 115 (e.g., UE 115-a), one or more network entities (e.g., network entity 105-a), and a service-based network 205. In some aspects, the service-based network 205 may be configured to communicate or interface with a RAN 210 of the wireless communications system 200, where the RAN 210 includes the one or more network entities (e.g., network entity 105-a). The service-based network 205 may support or offer a set of core network services 215 (e.g., a first core network service 215-a, a second core network service 215-b, a third core network service 215-c, a fourth core network service 215-d, and a fifth core network service 215-e). In some implementations, the service-based network 205 may include or be associated with a cloud platform, where the respective core network services 215 are hosted at respective network addressees in the cloud platform.

The UE 115-a may communicate with the network entity 105-a using one or more communication links 220, which may include an example of an access link (e.g., a Uu link). The communication link 220 may include a bi-directional link that can include both uplink and downlink communication. Similarly, the network entity 105-a of the RAN 210 may be configured to communicate with (e.g., interface with) the service-based network 205 via one or more communication links (e.g., communication link 225), where the communication link 225 may be configured to facilitate bi-directional communications between the network entity 105-a and each of the respective core network services 215 of the service-based network 205.

As shown in FIG. 2, the wireless communications system 200 may exhibit a service-based architecture where the entities of the RAN 210 (e.g., network entity 105-a) are configured to connect the UE 115-a to core network services 215 of the service-based network 205. In particular, the RAN 210 (e.g., network entity 105-a) may be configured to relay communications between the UE 115-a and the various core network services 215 of the service-based network 205 to enable the UE 115-a to establish and maintain wireless connections with the respective core network services 215 in order to exchange communications associated with the various network functionalities that are supported by the respective core network services 215. In other words, the wireless communications system 200 may enable the UE 115-a to "subscribe" to the respective core network services 215 on an ala carte basis depending on the needs or requirements of the UE 115-a. In this regard, different UEs 115 within the wireless communications system 200 may be able to subscribe to different subsets of core network services 215 depending on the capabilities of the UEs 115, applications executed at the UEs 115, a mobility of the UEs 115, etc.

Each core network service 215 may be associated with a respective network address within the service-based network 205. Stated differently, each core network service 215 may be hosted at one or more components of a cloud-based network, where the components of each core network service 215 may be associated with a respective network address. The respective core network services 215 may be provided by network providers, third-party entities, etc., where each core network service 215 is configured to support a respective service or functionality offered to the components of the wireless communications system 200 (e.g., UE 115-a, network entity 105-a).

Different services, functionalities, and core network functions that may be supported or offered by the respective core network services 215 may include, but are not limited to, a mobility service, a security service, a privacy service, a location service, etc. For example, the first core network service 215-*a* may include a core network mobility service that that hosts information and provides signaling that facilitate the geographical movement of the UE 115-*a* throughout wireless communications system. By way of another example, the second core network service 215-*b* may include a security service that provides security and encryption services to subscribing UEs 115 within the wireless communications system 200.

The service-based network 205 may provide subscription and policy services (e.g., one core network service 215 may be a subscription service and another one core network service 215 may be a policy service). Subscription and/or policy services may be offered for other core network services to receive relevant information (e.g., network subscription or operator policy information) pertaining to a given UE (e.g., the UE 115-*a*). If the UE 115-*a* is authorized, the subscription and/or policy services may provide network subscription or policy information to the UE 115-*a*, or the UE 115-*a* may request to create or modify network subscription or policy information.

In some aspects, each core network service 215 may include a respective API configured to facilitate wireless communications with the network entity 105-*a* and the UE 115-*a*, such as the network service APIs 180 illustrated in FIG. 1. APIs at the respective core network services 215 may include routing APIs, configuration APIs, or both. Routing APIs may be configured for service data unit communications between the UE 115-*a* and the respective core network services 215. Comparatively, configuration APIs may be configured to facilitate communications between the network entity 105-*a* and the respective core network services 215 to negotiate service requirements and service-specific operation.

In some aspects, the network entity 105-*a* (e.g., a DU 165) may facilitate traffic routing (e.g., service data unit routing) from the UE 115-*a* to the core network services 215, and vice versa. The network entity 105-*a* may facilitate traffic routing between the respective devices directly, via other network entities 105-*a*, via proxy, or any combination thereof. Moreover, in some cases, the UE 115-*a* may be communicatively coupled to multiple network entities 105 (e.g., dual connectivity), where the multiple network entities 105 facilitate traffic routing with the same or different sets of core network services 215. Additionally, the network entity 105-*a* may support service configurations or service contexts associated with communications parameters within the system, such as QoS flows, security, and UE 115 service contexts. In some aspects, the communication link 220 between the network entity 105-*a* and the UE 115-*a* may be associated with an access stratum configuration that facilitates over-the-air service awareness. The access stratum configuration may include including logical channels, access stratum security, access stratum context, and the like. For example, the access stratum configuration may be associated with a service-specific configuration (e.g., logical channels corresponding to QoS flows for each respective core network service 215) and a service-agnostic configuration (e.g., parameters which are common to all core network services 215).

The service-based wireless communications system 200 illustrated in FIG. 2 may exhibit several differences and advantages as compared to some other types of wireless systems, such as networks that instead exhibit a relatively more vertical, hierarchical architecture that includes many "layers" of different devices that perform functions for the network. A more hierarchical structure may result in processing and other functions being performed at multiple devices (e.g., network entity 105 and one or more back-end devices), thereby leading to inefficient use of resources and excessive power consumption. Additionally, the back-end architecture of a network with a more vertical, hierarchical architecture may be owned and maintained by a small handful of operators, which may render it difficult for other parties/entities to integrate with such systems, and services offered to UEs 115 and other devices may be difficult to customize within such systems.

Comparatively, service-based wireless communications system 200 illustrated in FIG. 2 exhibits a flatter, horizontal architecture which enables the respective functions of wireless communications systems to be distributed across different components (e.g., core network services 215) of the system. For example, such functions and protocols may be divided up and distributed across the set of core network services 215 such that each core network service 215 may support or enable a small portion of the capabilities and functionality of conventional wireless communications systems. In other words, the service-based architecture may enable functions and protocols to be split into self-contained services (e.g., core network services 215) as compared to components that provide all-encompassing network functions and protocols (e.g., modularization of network services/functionality across multiple core network services 215).

In this regard, the wireless communications system 200 may illustrate an example of a cloud-native platform configured to host a merger of CN and RAN services, which may simplify protocols and reduce a duplication of processing operations across CN and RAN (e.g., redistribution of CN and RAN 210 services). In other words, the convergence of RAN 210 and CN functions may reduce repeated operations and functionality to serve one UE at different layers.

The wireless communications system 200 may extend benefits associated with the service-based architecture of the service-based network 205 to the RAN 210, including benefits of increased scalability, resiliency, elasticity, agility, reuse, visibility, automation, and failover. Additionally, the service-based architecture may enable each core network service 215 across RAN 210 and CN to scale independently by increasing or decreasing resources allocated across the respective core network services 215 independently.

The core network services 215 and the UE 115-*a* may share a common discovery framework for discovery of core network services 215 offered by the service-based network 205. Discovery of and access to the core network services 215 may be independent. The UE 115-*a* may discover or access core network services directly (e.g., using a respective network address associated with a given core network service 215) or indirectly (e.g., via a proxy which routes communications to a given core network service).

As described herein, groups of core network services 215 may share a credential or network subscription for a give UE 115-*a*. For example, a service group may be a group of core network services 215 that are addressable independently. In some cases, a service group may provide a service as a service, meaning that a service group may present a unified interface to other core network services 215 or service groups. For example, a single network operator may provide multiple service groups associated with multiple UE credentials, or multiple operators may provide multiple service groups, each associated with respective credentials. Each service group may include a set of multiple core network services 215. A UE 115-*a* may establish wireless connections with service groups in the service-based network 205.

The UE 115-*a* may establish a service context for communications with multiple core network services 215 in a same service group. For example, a service context may be a security context (e.g., authentication information or a key agreement) or a network subscription.

For example, the UE 115-*a* may establish a connection with the service-based network 205 via the network entity 105-*a*. In some cases, the UE 115-*a* may receive control signaling from the service-based network 205 via the network entity 105-*a* indicating a set of multiple service groups offered by the service-based network 205. The control signaling may indicate the services included in each service group and how to access the service group (e.g., a credential or network subscription to use to access the service group). In some cases, the set of multiple service groups offered by the service-based network may be pre-configured, and the UE 115-*a* may identify the pre-configured set of service groups, for example via accessing a memory location storing an identification of the pre-configured set of service groups. For example, the pre-configuration of the set of service groups may be stored in a universal subscriber identity module (USIM) of the UE 115-*a*. The UE 115-*a* may transmit an access request indicating a selected service group to the network, and in response, the network may indicate a service context for communicating with the services included in the service group. For example, the service context may be a master security context, from which security contexts for each of the core network services in the service group may be derived. Accordingly, the UE 115-*a* may use the same service context to access the different core network services in the service group.

Figure 3:
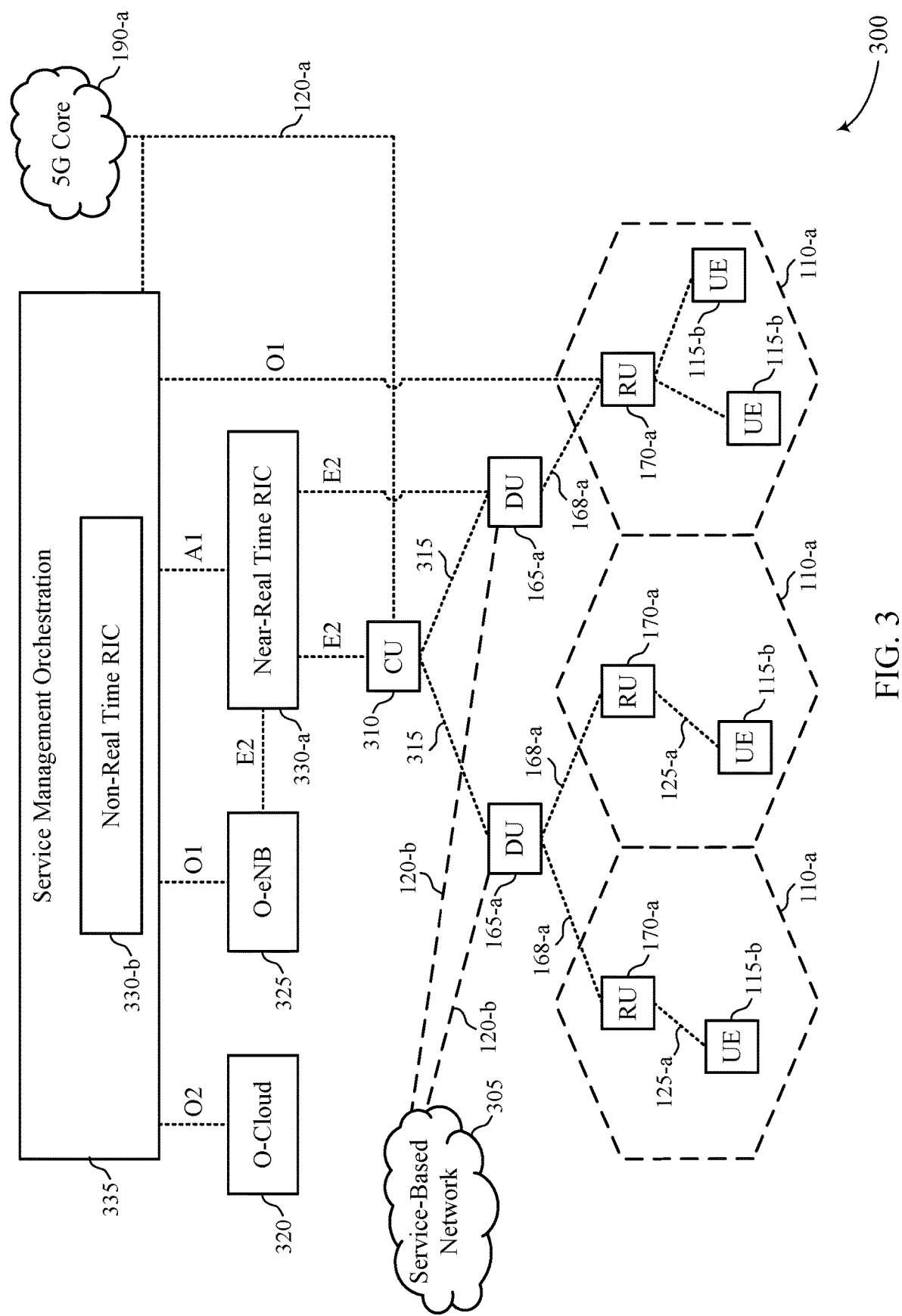
FIG. 3 illustrates an example of a network architecture that supports service groups in a service-based wireless system in accordance with one or more aspects of the present disclosure.

FIG. 3 illustrates an example of a network architecture 300 that supports service groups in a service-based wireless system in accordance with one or more aspects of the present disclosure. The network architecture 300 may illustrate an example for implementing one or more aspects of the wireless communications system 100. The network architecture 300 may include a service-based network 305, which may be an example of a service-based network 130 or 205, that communicates with DUs 165-*a* via links 120-*b*. In this example, DUs 165 may also communicate with one or more CUs 310 that may communicate directly with a 5G core 190-*a* via a backhaul communication link 120-*a*, or indirectly with the 5G core 190-*a* through one or more disaggregated network entities 105 (e.g., a Near-RT RIC 330-*a* via an E2 link, or a Non-RT RIC 330-*b* associated with an SMO 335 (e.g., an SMO Framework), or both). A CU 310 may communicate with one or more DUs 165-*a* via respective midhaul communication links 315 (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*b* via one or more communication links 125-*a*. In some implementations, a UE 115-*b* may be simultaneously served by multiple RUs 170-*a*.

Each of the network entities 105 of the network architecture 300 (e.g., CUs 310, DUs 165-*a*, RUs 170-*a*, Non-RT RICs 330-*a*, Near-RT RICs 330-*b*, SMOs 335, Open Clouds (O-Clouds) 320, Open eNBs (O-eNBs) 325) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 310 may host one or more higher layer control functions. Such control functions may include RRC, PDCP, SDAP, or the like. Each control function may be implemented with an interface configured to communicate signals with other control functions hosted by the CU 310. A CU 310 may be configured to handle user plane functionality (e.g., CU-UP), control plane functionality (e.g., CU-CP), or a combination thereof. In some examples, a CU 310 may be logically split into one or more CU-UP units and one or more CU-CP units. A CU-UP unit may communicate bidirectionally with the CU-CP unit via an interface, such as an E1 interface when implemented in an O-RAN configuration. A CU 310 may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, when interfacing with service-based network 305, a DU 165-*a* may host one or more APIs for one or more services of the service-based network 305 and one or more corresponding services at one or more UEs 115-*b*. In some examples, when interfacing with CUs 310, a DU 165-*a* may host, at least partially, one or more of an RLC layer, a MAC layer, and one or more aspects of a PHY layer (e.g., a high PHY layer, such as modules for forward error correction (FEC) encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 310.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*b*. In some implementations, real-time and non-real-time aspects of control and user plane communication with the RU(s) 170-*a* may be controlled by the corresponding DU 165-*a*. In some examples, such a configuration may enable a DU 165-*a* and a CU 310 to be implemented in a cloud-based RAN architecture, such as a vRAN architecture.

The SMO 335 may be configured to support RAN deployment and provisioning of non-virtualized and virtualized network entities 105. For non-virtualized network entities 105, the SMO 335 may be configured to support the deployment of dedicated physical resources for RAN coverage requirements which may be managed via an operations and maintenance interface (e.g., an O1 interface). For virtualized network entities 105, the SMO 335 may be configured to interact with a cloud computing platform (e.g., an O-Cloud 320) to perform network entity life cycle management (e.g., to instantiate virtualized network entities 105) via a cloud computing platform interface (e.g., an O2 interface). Such virtualized network entities 105 can include, but are not limited to, CUs 310, DUs 165-*a*, RUs 170-*a*, and Near-RT RICs 330-*a*. In some implementations, the SMO 335 may communicate with components configured in accordance with a 4G RAN (e.g., via an O1 interface). Additionally, or alternatively, in some implementations, the SMO 335 may communicate directly with one or more RUs 170-*a* via an O1 interface. The SMO 335 also may include a Non-RT RIC 330-*b* configured to support functionality of the SMO 335.

The Non-RT RIC 330-*b* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 330-*a*. The Non-RT RIC 330-*b* may be coupled to or communicate with (e.g., via an A1 interface) the Near-RT RIC 330-*a*. The Near-RT RIC 330-*a* may be configured to include a logical function that enables near-real-time control and optimization of RAN elements and resources via data collection and actions over an interface (e.g., via an E2 interface) connecting one or more CUs 310, one or more DUs 165-*a*, or both, as well as an O-eNB 325, with the Near-RT RIC 330-*a*.

In some examples, to generate AI/ML models to be deployed in the Near-RT RIC 330-*b*, the Non-RT RIC 330-*b* may receive parameters or external enrichment information from external servers. Such information may be utilized by the Near-RT RIC 330-*a* and may be received at the SMO 335 or the Non-RT RIC 330-*b* from non-network data sources or from network functions. In some examples, the Non-RT RIC 330-*b* or the Near-RT RIC 330-*a* may be configured to tune RAN behavior or performance. For example, the Non-RT RIC 330-*b* may monitor long-term trends and patterns for performance and employ AI or ML models to perform corrective actions through the SMO 335 (e.g., reconfiguration via O1) or via generation of RAN management policies (e.g., A1 policies).

Figure 4:
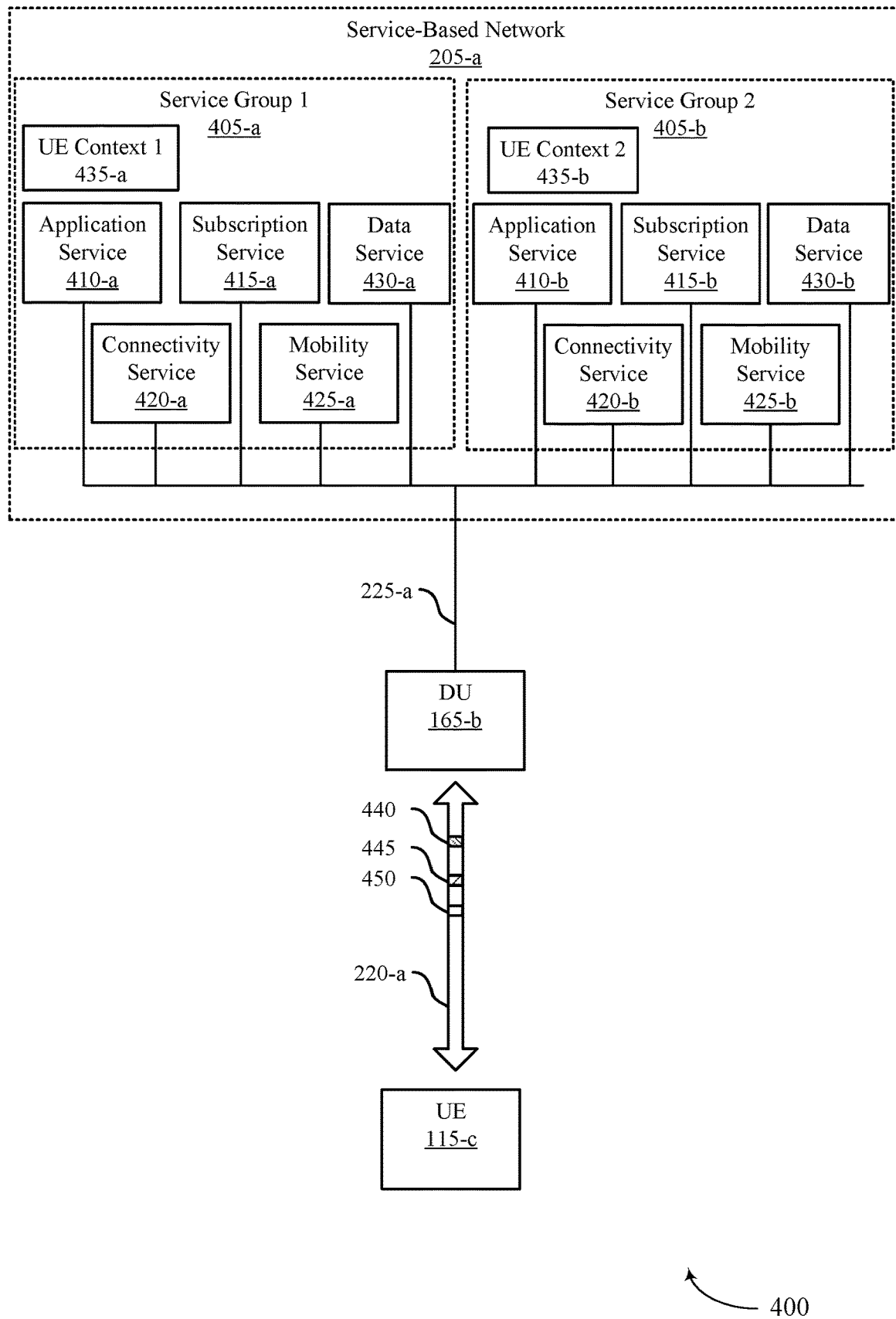
FIG. 4 illustrates an example of a wireless communication system that supports service groups in a service-based wireless system in accordance with one or more aspects of the present disclosure.

FIG. 4 illustrates an example of a wireless communications system 400 that supports service groups in a service-based wireless system in accordance with one or more aspects of the present disclosure. Aspects of the wireless communications system 400 may implement, or be implemented by, aspects of the wireless communications system 100 or the wireless communications system 200. In some implementations, the wireless communications system 400 illustrates an example service-based wireless communications system, such as the system described with reference to FIG. 1 and FIG. 2.

The wireless communications system 400 may include one or more UEs 115 (e.g., UE 115-*c*), one or more DUs 165-*b* (e.g., located at a network entity 105), and a service-based network 205-*a*. In some aspects, the service-based network 205-*a* may be configured to communicate or interface with the DU 165-*b*. The service-based network 205-*a* may support or offer a set of service groups 405 (e.g., a first service group 405-*a* and a second service group 405-*b*), and each service group 405 may include a set of core network services (e.g., core network services 215 as described with reference to FIG. 2). For example, the first service group 405-*a* may include an application service 410-*a*, a subscription service 415-*a*, a connectivity service 420-*a*, a mobility service 425-*a*, and a data service 430-*a*, and the second service group 405-*b* may include an application service 410-*b*, a subscription service 415-*b*, a connectivity service 420-*b*, a mobility service 425-*b*, and a data service 430-*b*. In some examples, as described herein, the service-based network 205-*a* may include or be associated with a cloud platform, where the respective core network services 215 are hosted at respective network addressees in the cloud platform.

The UE 115-*c* may communicate with the DU 165-*b* using one or more communication links 220-*a*, which may include an example of an access link (e.g., a Uu link). The communication link 220-*a* may include a bi-directional link that can include both uplink and downlink communication. Similarly, the DU 165-*b* may be configured to communicate with (e.g., interface with) the service-based network 205-*a* via one or more communication links (e.g., communication link 225-*a*), where the communication link 225-*a* may be configured to facilitate bi-directional communications between the DU 165-*b* and each of the respective core network services (e.g., the application service 410-*a*, the subscription service 415-*a*, the connectivity service 420-*a*, the mobility service 425-*a*, the data service 430-*a*, the application service 410-*b*, the subscription service 415-*b*, the connectivity service 420-*b*, the mobility service 425-*b*, and the data service 430-*b*) of the service-based network 205. In particular, the DU 165-*b* may be configured to relay communications between the UE 115-*c* and the various core network services of the service-based network 205-*a* to enable the UE 115-*a* to establish and maintain wireless connections with the respective core network services in order to exchange communications associated with the various network functionalities that are supported by the respective core network services.

A service group 405 may be a group of core network services that are addressable independently. In some cases, a service group 405 may provide a service as a service, meaning that a service group may present a unified interface to other core network services of service groups. For example, the first service group 405-*a* may present a unified interface to the second service group 405-*b* or to the application service 410-*b*, the subscription service 415-*b*, the connectivity service 420-*b*, the mobility service 425-*b*, or the data service 430-*b*. Labeling or addressing for core network services within a service group 405 may be common. Security per a group of services may be common. In some cases, security in service group-to-service group communication may be common between the core network services in a service group. In some cases, a mobility service 425-*a* in one service group (e.g., the first service group 405-*a*) may provide mobility as a service for another service group (e.g., the second service group 405-*b*, for example if the second service group 405-*b* does not include a mobility service).

Each core network service within a given service group 405 may share a same UE context 435. For example, the core network services (e.g., the application service 410-*a*, the subscription service 415-*a*, the connectivity service 420-*a*, the mobility service 425-*a*, and the data service 430-*a*) within the first service group 405-*a* may share a first UE context 435-*a* and the core network services within the second service group 405-*b* (e.g., the application service 410-*a*, the subscription service 415-*a*, the connectivity service 420-*a*, the mobility service 425-*a*, and the data service 430-*b*) may share a second UE context 435-*b*. Within a given service group 405, the security context established for the included core network services may be based on the same UE credentials or network subscription. In some cases, service groups may be behind a proxy. For example, the DU 165-*b* may route communications to a proxy service, which may then route the communications to the targeted service group rather than the DU 165-*b* routing communications to network addresses associated with the core network services.

Service groups may be isolated (e.g., communicatively isolated) from each other. For example, the first service group 405-*a* may be isolated from the second service group 405-*b*. In some cases, the service groups 405 may exchange communications. For example, the mobility service 425-*a* may provide mobility services for the second service group 405-*b* (e.g., if the second service group 405-*b*) does not include a mobility service. Different service groups may be operated by the same or by different network operators. In some cases, the first UE context 435-*a* and the second UE context 435-*b* may be associated with the same UE credentials. In some cases, the first UE context 435-*a* and the second UE context 435-*b* may be associated with different UE credentials.

The service-based network 205-*a* may provide control information 440 to the UE 115-*c* via the DU 165-*b* regarding which core network services are included within the service groups 405. In other words, the service-based network 205-*a* may provide information regarding which core network services the UE 115-*c* may invoke or establish a service context with using a common set of UE contexts derived from the same network subscription and/or credentials. In some cases, a UE context 435 may include, for example, a security context, meaning that core network services within the same service group may derive a security context with the UE 115-*c* based on a common master security context. In some cases, a UE context 435 may include, for example, a policy context, meaning that service policies for each core network service may be derived from a common set of policies and the same network subscription information.

Core network services may invoke or subscribe to other core network services in the same service group 405. For example, the data service 430-*a* within the first service group may subscribe to the mobility service 425-*a* to move the data service across DUs 165 or RAN nodes (e.g., network entities 105) as the UE 115-*c* changes locations. The control information 440 may also indicate operator information for each service group 405 (e.g., the public land mobile network identifier or non-public network identifier). The control information 440 may also indicate whether different service groups 405 are isolated from each other (e.g., whether core network services within the service groups 405 communicate with core network services in other service groups 405).

Based on the control information 440, the UE 115-*c* may determine to access a set of core network services within a same service group 405 based on demands at the UE 115-*c* (e.g., data connectivity for specific application or data flows, location services, or specific mobility). The UE 115-*c* may determine which network subscription or credentials to use to access the service group 405 based on the control information 440. The UE 115-*c* may transmit, an access request 445 to the service-based network 205-*a* via the DU 165-*b* indicating a selected service group 405 of the indicated service groups 405. For example, the access request 445 may indicate the first service group 405-*a* and the network subscription or credential associated with the first service group 405-*a*.

In response to the access request 445, the service-based network 205-*a* may provide to the UE 115-*c*, via the DU 165-*b*, control information 450 indicating a service context for communicating with the set of core network services for the first service group 405-*a*. Accordingly, when accessing any of the core network services in the first service group 405-*a*, the UE may use the service context (e.g., the UE or core network service identification) that points to the common network subscription or credentials for the first service group 405-*a*. In some cases, the service context may be a master security context, and the UE 115-*c* may derive a security context for any particular service in the first service group from the master security context.

After establishing communications (e.g., after establishing a service context) with the first service group 405-*a*, the UE 115-*c* may determine to communicate with a core network service included in the second service group 405-*b*. The UE 115-*c* may determine to establish a second UE context 435-*b* over the same radio access (e.g., via the same RAN) and determine to establish a new master security context with the second service group 405-*b*. The UE 115-*c* may also determine whether to use the same network subscription for the second service group 405-*b* as for the first service group 405-*a*. The UE 115-*c* may also determine whether, based on the control information 440 indicating whether the first service group 405-*a* and the second service group 405-*b* are isolated, certain core network serviced can be reused from the first service group 405-*a*. For example, the UE 115-*c* may reuse the mobility service 425-*a* for core network services in the second service group 405-*b* when both service groups are activated for the UE 115-*c*. The UE 115-*c* may establish a service context with the second service group 405-*b* independently from the service context established for the first service group (e.g., via transmitting a second access request indicating the second service group 405-*b* and the appropriate credential).

Figure 5:
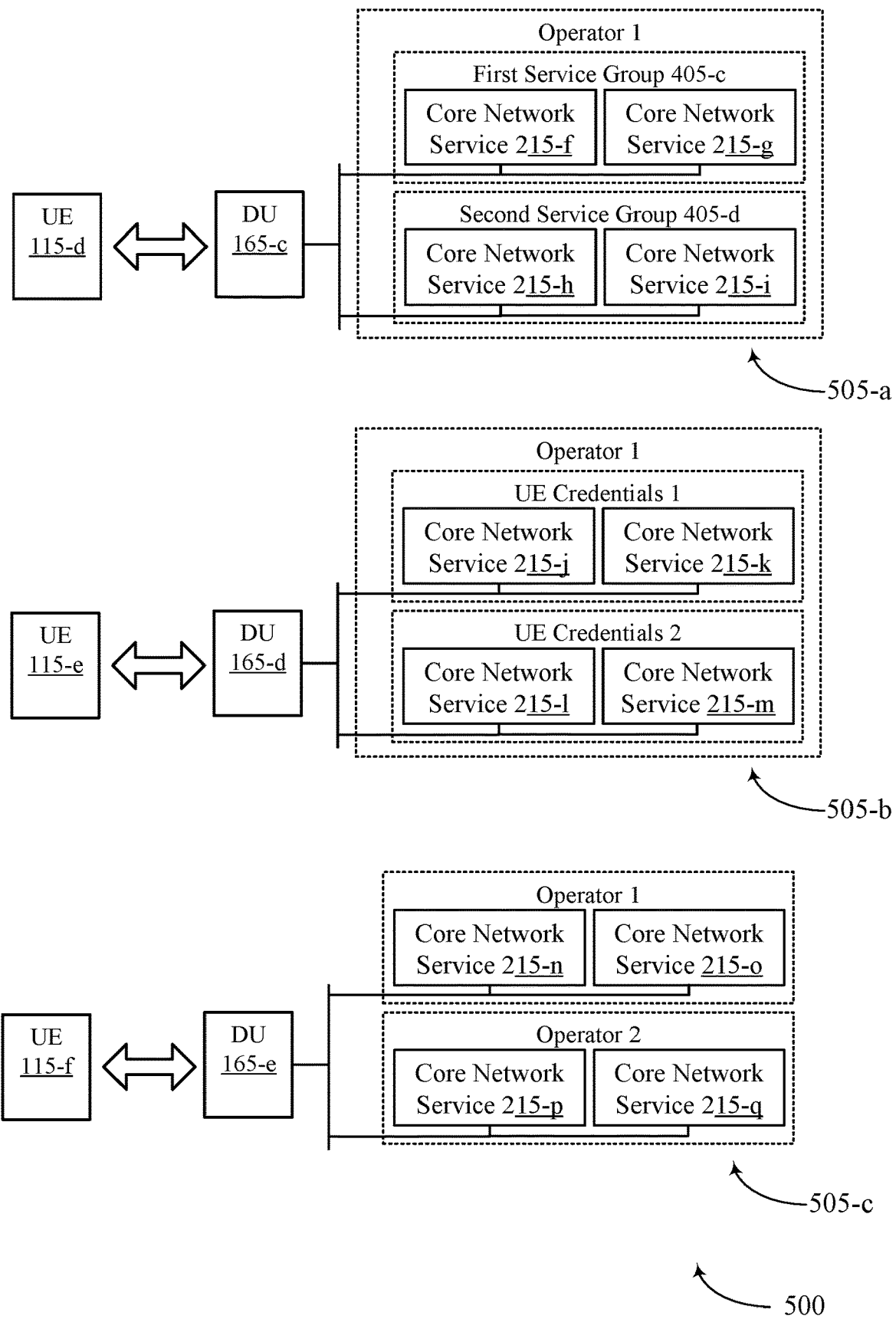
FIG. 5 illustrates an example of a system diagram that supports service groups in a service-based wireless system in accordance with one or more aspects of the present disclosure.

FIG. 5 illustrates an example of a system diagram 500 that supports service groups in a service-based wireless system in accordance with one or more aspects of the present disclosure. The system diagram illustrates a first example system 505-*a* corresponding to a first example service group use case, a second example system 505-*b* corresponding to a second example service group use case, and a third example system 505-*c* corresponding to a third example service group use case. Aspects of the system diagram 500 may implement, or be implemented by, aspects of the wireless communications system 100, the wireless communications system 200, or the wireless communications system 400.

In the first example system 505-*a*, a single network operator may provide core network services 215 via different service groups 405, which may be isolated. For example, the first service group 405-*c* may include a core network service 215-*f* and a core network service 215-*g*, and the first service group 405-*c* may be isolated from a second service group 405-*d*, which may include a core network service 215-*h* and a core network service 215-*i*. Accordingly, the single network operator may provide isolated core network services. The single network operator may offer independent sets of core network services (e.g., service groups 405) to a subscriber UE 115-*d*. The UE 115-*d* may use the same UE credentials to access the first service group 405-*c* and the second service group 405-*d*. The UE 115-*d* may access the first service group 405-*c* and the second service group 405-*d* via a DU 165-*c*.

In the second example system 505-*b*, a UE 115-*e* may use different UE credentials to access different sets of core network services offered by a same network operator. For example, the second example system 505-*b* may illustrate a multi subscriber identify module (SIM) over a same access case. A first set of UE credentials may be associated with a first core network service 215-*j* and a second core network service 215-*k* offered by a network operator. A second set of UE credentials may be associated with a third core network service 215-1 and a fourth core network service 215-*m* offered by the network operator. Accordingly, the first core network service 215-*j* and the second core network service 215-*k* may correspond to a first service group, and the third core network service 215-1 and the fourth core network service 215-*m* may correspond to a second service group. The first and second service groups may be isolated or may not be isolated. The UE 115-*e* may access the first service group and the second service group via a DU 165-*d*.

In the third example system 505-*c*, a UE 115-*f* may use different UE credentials to access different sets of core network services offered by different network operators. A first set of UE credentials may be associated with a first core network service 215-*n* and a second core network service 215-*o* offered by a first network operator. A second set of UE credentials may be associated with a third core network service 215-*p* and a fourth core network service 215-*q* offered by a second network operator. Accordingly, the first core network service 215-*n* and the second core network service 215-*o* may correspond to a first service group, and the third core network service 215-*p* and the fourth core network service 215-*q* may correspond to a second service group. The first and second service groups may be isolated or may not be isolated. The UE 115-*f* may access the first service group and the second service group via a DU 165-*e*. Accordingly, the same DU 165-*e* may provide access to multiple network operators (e.g., the third example system 505-*c* illustrates a RAN sharing system). For example, the first network operator may be an enterprise network, and the second network operator may be a public network, and the UE 115-*f* may use the same DU 165-*e* to access both.

Figure 6:
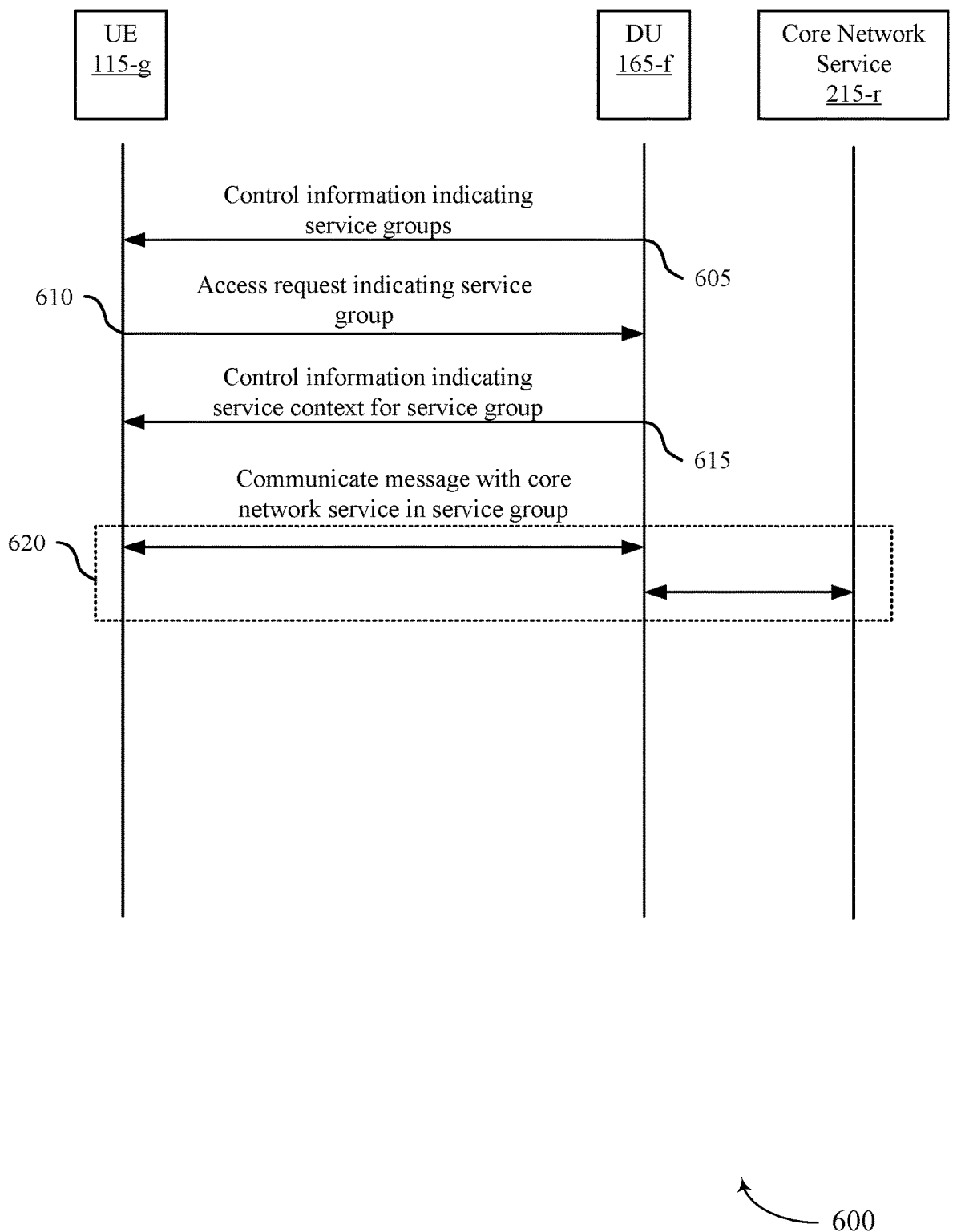
FIG. 6 illustrates an example of a process flow that supports service groups in a service-based wireless system in accordance with one or more aspects of the present disclosure.

FIG. 6 illustrates an example of a process flow 600 that supports service groups in a service-based wireless system in accordance with one or more aspects of the present disclosure. The process flow 600 may include a UE 115-*g*, which may be an example of a UE 115 as described herein. The process flow 600 may include a DU 165-*f*, which may be an example of a DU 165 as described herein. The process flow 600 may include a core network service 215-*r*, which may be an example of a core network service 215 as described herein. In the following description of the process flow 600, the operations between the UE 115-*g*, the DU 165-*f*, and the core network service 215-*r* may be transmitted in a different order than the example order shown, or the operations performed by the UE 115-*g*, the DU 165-*f*, and the core network service 215-*r* may be performed in different orders or at different times. Some operations may also be omitted from the process flow 600, and other operations may be added to the process flow 600.

At 605, the DU 165-*f* may transmit, and UE 115-*g* may receive, via a wireless connection between the UE 115-*g* and the DU 165-*f*, first control information indicating a set of multiple service groups offered by a service-based network configured to interface with a RAN associated with the DU 165-*f*. The first control information may indicate, for each service group of the set of multiple service groups, a respective set of core network services included in the service group and a respective network credential for accessing the service group. In some cases, instead of receiving the first control information from the DU 165-*f*, the UE 115-*g* may identify the first control information indicating the set of multiple service groups offered by the service-based network of multiple service groups offered by the service-based network based on a pre-configuration stored in memory at the UE 115-*g*. For example, a pre-configuration of the set of service groups may be stored in a universal subscriber identity module (USIM) of the UE 115-*a*. For example, the pre-configuration may indicate, for each service group of the set of multiple service groups, a respective set of core network services included in the service group and a respective network credential for accessing the service group.

At 610, the UE 115-*g* may transmit, and the DU 165-*f* may receive, in response to the first control information, an access request indicating a first service group of the set of multiple service groups and the respective network credential for the first service group.

At 615, the DU 165-*f* may transmit, and the UE 115-*g* may receive, in response to the access request, second control information indicating a service context for communicating with the respective set of core network services for the first service group.

At 620, the DU 165-*f* may communicate, a message received from the UE in accordance with the service context to the core network service 215-*r* of the respective set of core network services for the first service group.

In some cases, the service context may be a master context associated with the first service group, and the UE 115-*g* may determine a respective security context for each core network service included in the first service group based on the master security context. In some cases, communicating the message in accordance with the service context includes communicating the message in accordance with the determined respective security context for the core network service. In some cases, the master security context may be authentication information, a key agreement, or both In some cases, the DU 165-*f* may communicate a second message received from the UE 115-*g* in accordance with the service context to a second core network service of the respective set of core network services.

In some cases, the core network service is configured to invoke a second core network service included in the first service group based on the message being communicated to the core network service. In some cases, the core network service may be a data service, and the second core network service may be a mobility service.

In some cases, the DU 165-*f* may receive, from the UE 115-*g* and in response to the first control information, a second access request indicating a second service group of the set of multiple service groups and the respective network credential for the second service group. The DU 165-*f* may transmit, to the UE 115-*g* and in response to the second access request, third control information indicating a second service context for communicating with the respective set of core network services for the second service group. The DU 165-*f* may communicate a second message received from the UE 115-*g* in accordance with the second service context to a second core network service of the respective set of core network services included in the second service group. In some cases, the second core network service is configured to invoke a third core network service included in the first service group based on the second message being communicated to the second core network service. In some cases, the second core network service may be a data service, and the third core network service may be a mobility service. In some cases, transmitting the first control information may include transmitting an indication that the first service group does not communicate with the second service group.

In some cases, transmitting the first control information may include transmitting an indication of whether each service group of the set of multiple service groups is capable of communication with one or more other service groups of the set of multiple service groups.

In some cases, transmitting the first control information may include transmitting an indication of a respective network subscription associated with each of the set of multiple service groups, wherein receiving the access request is based on the respective network subscription associated with the first service group.

In some cases, the service context includes a radio access network configuration for communicating with the UE 115-*g* as part of using the core network service.

In some cases, each core network service of the respective set of core network services is associated with a respective API of a set of multiple APIs.

In some cases, the respective set of core network services includes a mobility service, a connection state management service, a security service, a paging service, a radio access service, a data service, a capability management service, a location service, a messaging service, or any combination thereof.

In some cases, the access request, the message, or both, are transmitted to the DU 165-*f* for relay to a network address associated with the core network service 215-*r*.

Figure 7:
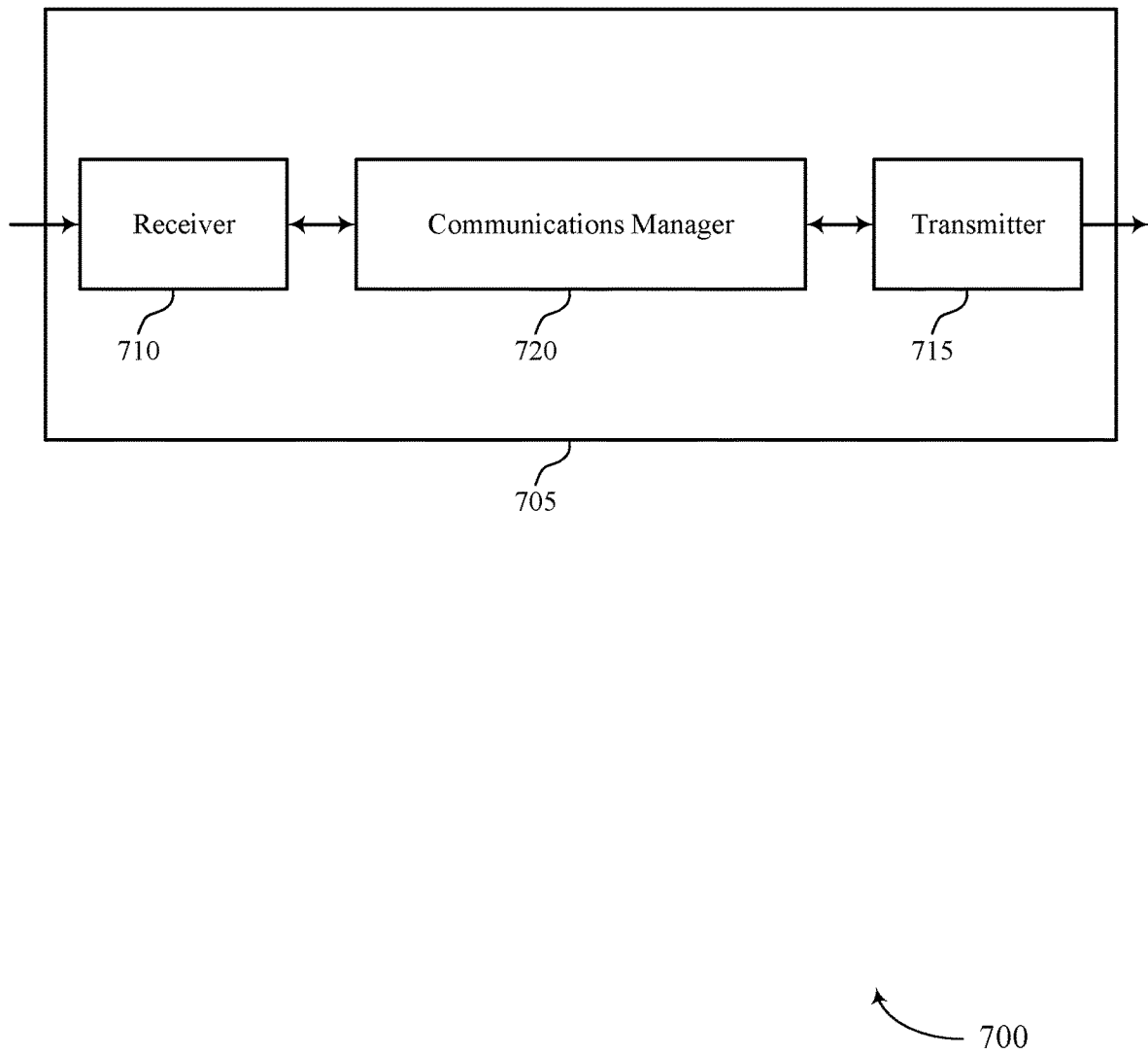
FIGS. 7 and 8 show block diagrams of devices that support service groups in a service-based wireless system in accordance with one or more aspects of the present disclosure.

FIG. 7 shows a block diagram 700 of a device 705 that supports service groups in a service-based wireless system in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to service groups in a service-based wireless system). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to service groups in a service-based wireless system). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of service groups in a service-based wireless system as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for identifying first control information indicating a set of multiple service groups offered by a service-based network configured to interface with a RAN associated with a DU, where the control information indicates, for each service group of the set of multiple service groups, a respective set of core network services included in the service group and a respective network credential for accessing the service group. The communications manager 720 may be configured as or otherwise support a means for transmitting, in response to the first control information, an access request indicating a first service group of the set of multiple service groups and the respective network credential for the first service group. The communications manager 720 may be configured as or otherwise support a means for receiving, in response to the access request, second control information indicating a service context for communicating with the respective set of core network services for the first service group. The communications manager 720 may be configured as or otherwise support a means for communicating, in accordance with the service context, a message with a core network service of the respective set of core network services for the first service group.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, more efficient utilization of communication resources.

Figure 8:
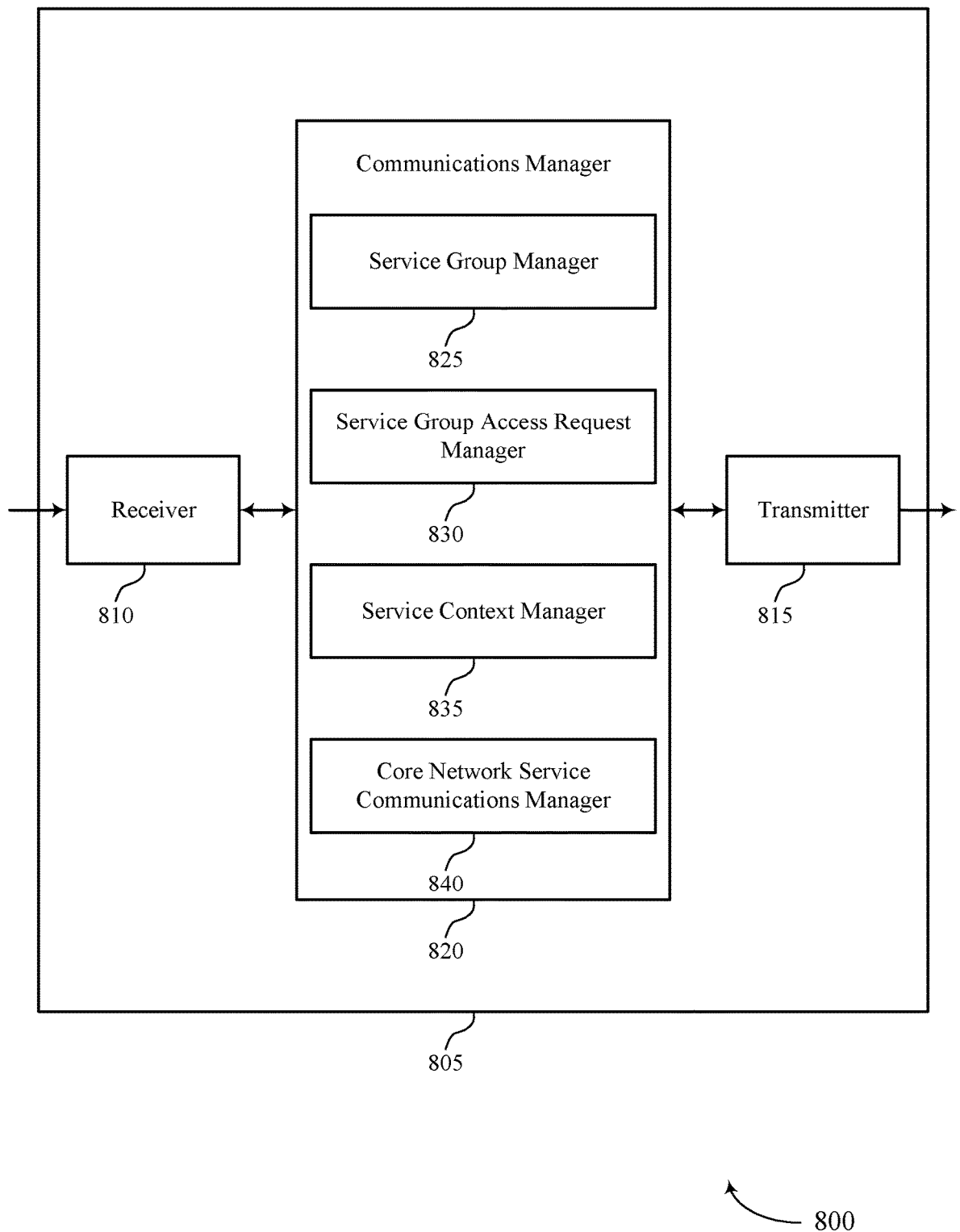

FIG. 8 shows a block diagram 800 of a device 805 that supports service groups in a service-based wireless system in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to service groups in a service-based wireless system). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to service groups in a service-based wireless system). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of service groups in a service-based wireless system as described herein. For example, the communications manager 820 may include a service group manager 825, a service group access request manager 830, a service context manager 835, a core network service communications manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The service group manager 825 may be configured as or otherwise support a means for identifying first control information indicating a set of multiple service groups offered by a service-based network configured to interface with a RAN associated with a DU, where the first control information indicates, for each service group of the set of multiple service groups, a respective set of core network services included in the service group and a respective network credential for accessing the service group. The service group access request manager 830 may be configured as or otherwise support a means for transmitting, in response to the first control information, an access request indicating a first service group of the set of multiple service groups and the respective network credential for the first service group. The service context manager 835 may be configured as or otherwise support a means for receiving, in response to the access request, second control information indicating a service context for communicating with the respective set of core network services for the first service group. The core network service communications manager 840 may be configured as or otherwise support a means for communicating, in accordance with the service context, a message with a core network service of the respective set of core network services for the first service group.

Figure 9:
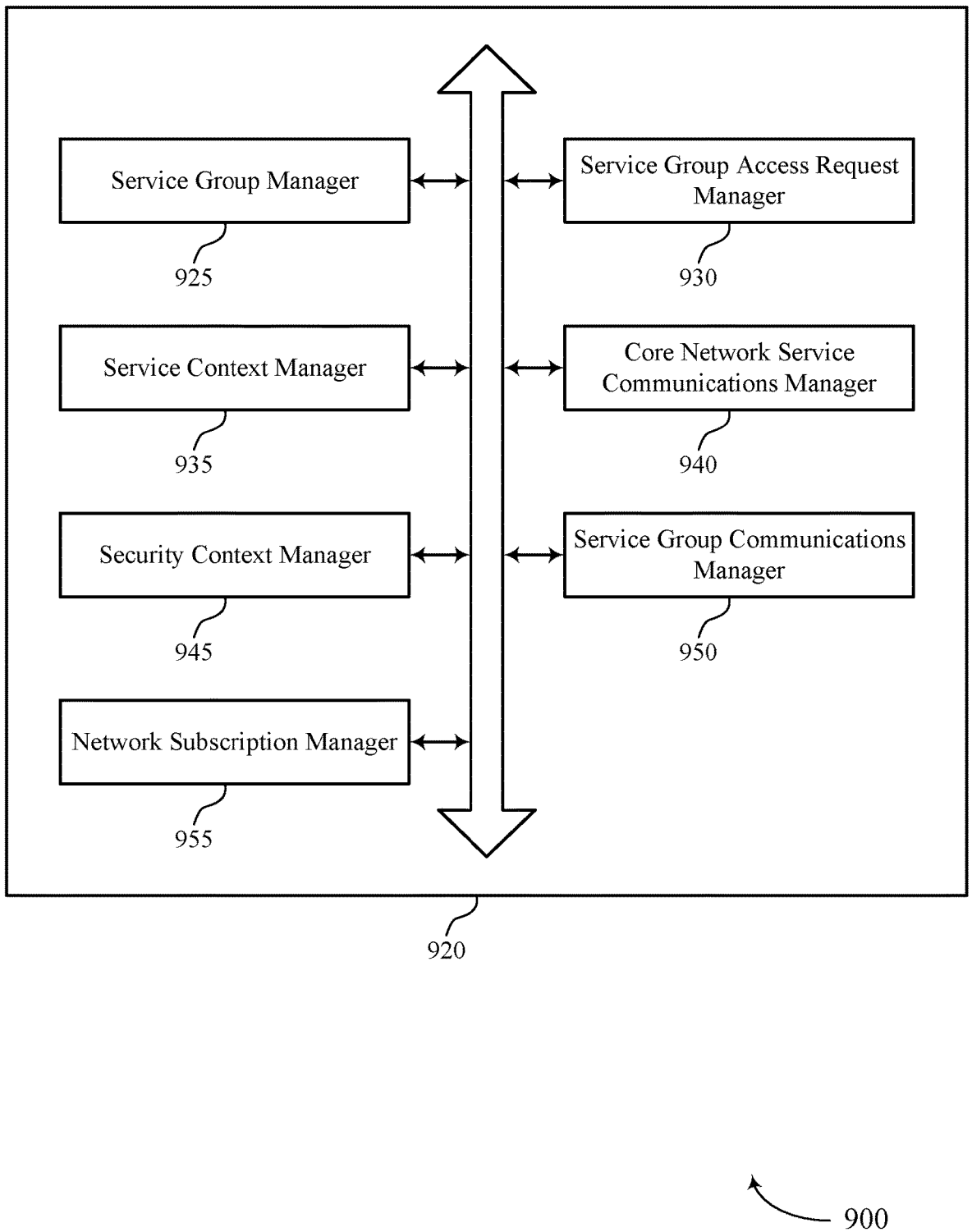
FIG. 9 shows a block diagram of a communications manager that supports service groups in a service-based wireless system in accordance with one or more aspects of the present disclosure.

FIG. 9 shows a block diagram 900 of a communications manager 920 that supports service groups in a service-based wireless system in accordance with one or more aspects of the present disclosure. The communications manager 920 may be an example of aspects of a communications manager 720, a communications manager 820, or both, as described herein. The communications manager 920, or various components thereof, may be an example of means for performing various aspects of service groups in a service-based wireless system as described herein. For example, the communications manager 920 may include a service group manager 925, a service group access request manager 930, a service context manager 935, a core network service communications manager 940, a security context manager 945, a service group communications manager 950, a network subscription manager 955, or any combination thereof. Each of these components may communicate, directly or indirectly, with one another (e.g., via one or more buses).

The communications manager 920 may support wireless communication at a UE in accordance with examples as disclosed herein. The service group manager 925 may be configured as or otherwise support a means for identifying first control information indicating a set of multiple service groups offered by a service-based network configured to interface with a RAN associated with a DU, where the first control information indicates, for each service group of the set of multiple service groups, a respective set of core network services included in the service group and a respective network credential for accessing the service group. The service group access request manager 930 may be configured as or otherwise support a means for transmitting, in response to the first control information, an access request indicating a first service group of the set of multiple service groups and the respective network credential for the first service group. The service context manager 935 may be configured as or otherwise support a means for receiving, in response to the access request, second control information indicating a service context for communicating with the respective set of core network services for the first service group. The core network service communications manager 940 may be configured as or otherwise support a means for communicating, in accordance with the service context, a message with a core network service of the respective set of core network services for the first service group.

In some examples, the service context includes a master security context associated with the first service group, and the security context manager 945 may be configured as or otherwise support a means for determining a respective security context for each core network service included in the first service group based on the master security context.

In some examples, to support communicating the message in accordance with the service context, the security context manager 945 may be configured as or otherwise support a means for communicating the message in accordance with the determined respective security context for the core network service.

In some examples, the master security context includes authentication information, a key agreement, or both.

In some examples, the core network service communications manager 940 may be configured as or otherwise support a means for communicating, in accordance with the service context, a second message with a second core network service of the respective set of core network services.

In some examples, the core network service is configured to invoke a second core network service included in the first service group based on the message being communicated with the core network service.

In some examples, the core network service includes a data service. In some examples, the second core network service includes a mobility service.

In some examples, the service group access request manager 930 may be configured as or otherwise support a means for transmitting, in response to the first control information, a second access request indicating a second service group of the set of multiple service groups and the respective network credential for the second service group. In some examples, the service context manager 935 may be configured as or otherwise support a means for receiving, in response to the second access request, third control information indicating a second service context for communicating with the respective set of core network services for the second service group. In some examples, the core network service communications manager 940 may be configured as or otherwise support a means for communicating, in accordance with the second service context, a second message with a second core network service of the respective set of core network services included in the second service group.

In some examples, the second core network service is configured to invoke a third core network service included in the first service group based on the second message being communicated with the second core network service.

In some examples, the second core network service includes a data service. In some examples, the third core network service includes a mobility service.

In some examples, to support identifying the first control information, the service group communications manager 950 may be configured as or otherwise support a means for identifying an indication that the first service group does not communicate with the second service group, where transmitting the second access request is based on the identifying that the first service group does not communicate with the second service group.

In some examples, to support identifying the first control information, the service group communications manager 950 may be configured as or otherwise support a means for identifying an indication of whether each service group of the set of multiple service groups is capable of communication with one or more other service groups of the set of multiple service groups.

In some examples, to support identifying the first control information, the network subscription manager 955 may be configured as or otherwise support a means for identifying an indication of a respective network subscription associated with each of the set of multiple service groups, where transmitting the access request is based on the respective network subscription associated with the first service group.

In some examples, the service context includes a radio access network configuration for communicating with the DU as part of using the core network service.

In some examples, the access request, the message, or both, are transmitted to the DU for relay to a network address associated with the core network service.

In some examples, each core network service of the respective set of core network services is associated with a respective API of a set of multiple APIs.

In some examples, the respective set of core network services include a mobility service, a connection state management service, a security service, a paging service, a radio access service, a data service, a capability management service, a location service, a messaging service, or any combination thereof.

In some examples, to support identifying the first control information, the service group manager 925 may be configured as or otherwise support a means for receiving the first control information via a wireless connection between the UE and the DU.

some examples, to support identifying the first control information, the service group manager 925 may be configured as or otherwise support a means for accessing the first control information from local storage at the UE.

Figure 10:
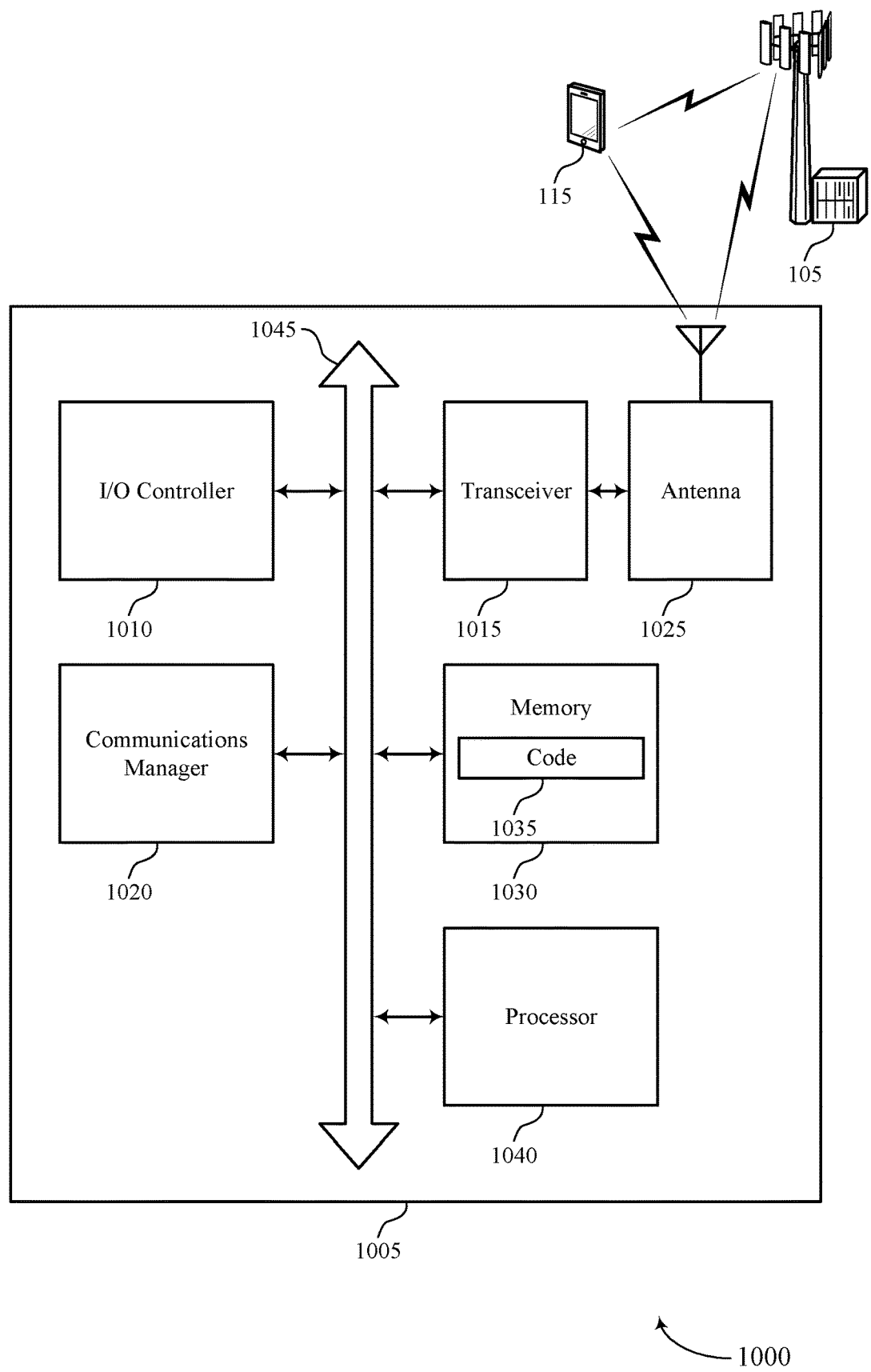
FIG. 10 shows a diagram of a system including a device that supports service groups in a service-based wireless system in accordance with one or more aspects of the present disclosure.

FIG. 10 shows a diagram of a system 1000 including a device 1005 that supports service groups in a service-based wireless system in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting service groups in a service-based wireless system). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for identifying first control information indicating a set of multiple service groups offered by a service-based network configured to interface with a RAN associated with a DU, where the first control information indicates, for each service group of the set of multiple service groups, a respective set of core network services included in the service group and a respective network credential for accessing the service group. The communications manager 1020 may be configured as or otherwise support a means for transmitting, in response to the first control information, an access request indicating a first service group of the set of multiple service groups and the respective network credential for the first service group. The communications manager 1020 may be configured as or otherwise support a means for receiving, in response to the access request, second control information indicating a service context for communicating with the respective set of core network services for the first service group. The communications manager 1020 may be configured as or otherwise support a means for communicating, in accordance with the service context, a message with a core network service of the respective set of core network services for the first service group.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of service groups in a service-based wireless system as described herein, or the processor 1040 and the memory 1030 may be otherwise configured to perform or support such operations.

Figure 11:
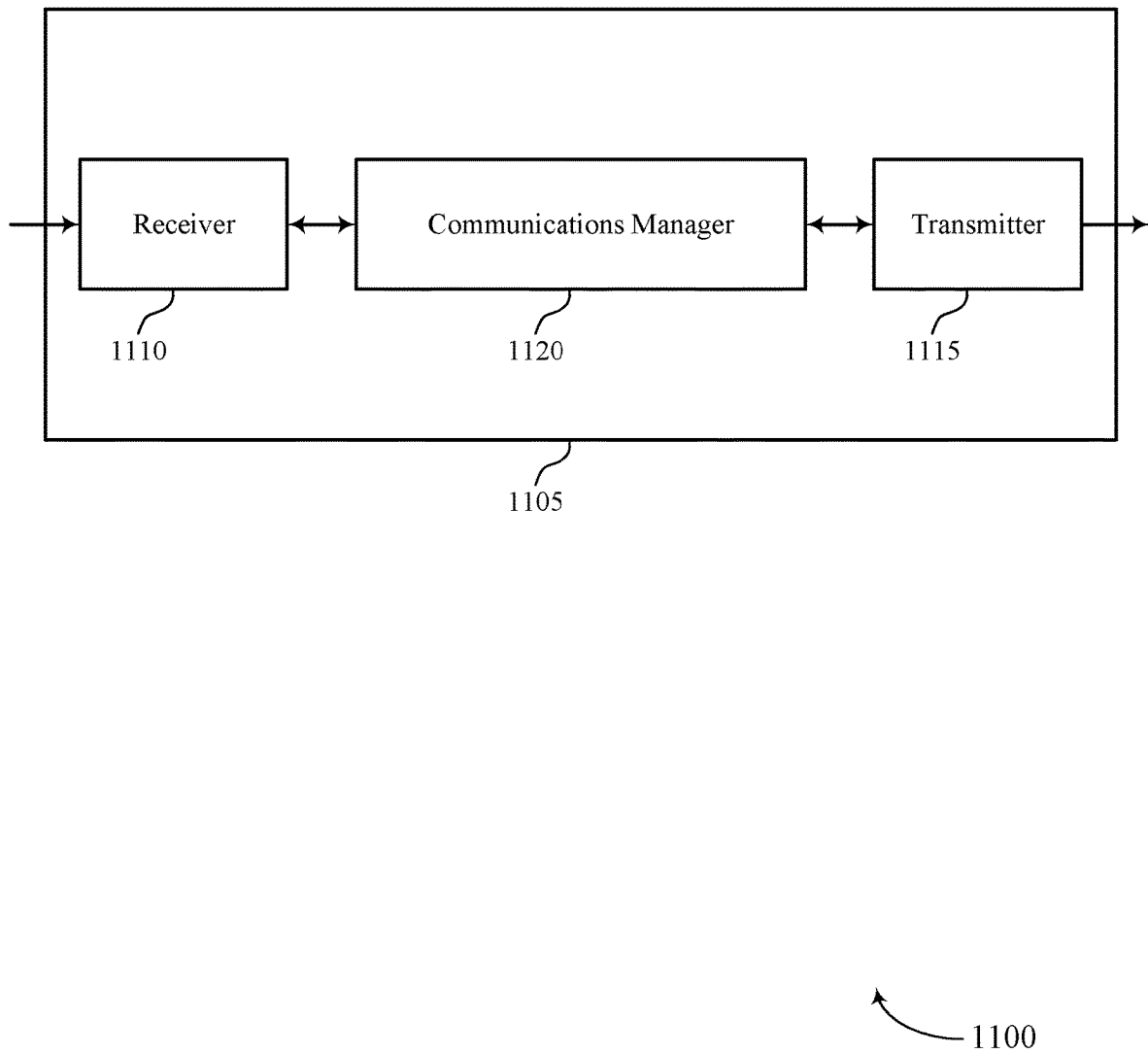
FIGS. 11 and 12 show block diagrams of devices that support service groups in a service-based wireless system in accordance with one or more aspects of the present disclosure.

FIG. 11 shows a block diagram 1100 of a device 1105 that supports service groups in a service-based wireless system in accordance with one or more aspects of the present disclosure. The device 1105 may be an example of aspects of a DU 165 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of service groups in a service-based wireless system as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a DU in accordance with examples as disclosed herein. For example, the communications manager 1120 may be configured as or otherwise support a means for receiving, from a UE, an access request indicating a first service group of a set of multiple service groups offered by a service-based network configured to interface with a RAN associated with the distributed unit, wherein each service group of the plurality of service groups includes a respective set of core network services, where each service group of the plurality of service groups is associated with a respective network credential for accessing the service group, and where the access request further indicates the respective network credential for the first service group. The communications manager 1120 may be configured as or otherwise support a means for transmitting, to the UE and in response to the access request, control information indicating a service context for communications between the UE and the respective set of core network services for the first service group. The communications manager 1120 may be configured as or otherwise support a means for communicating a message received from the UE in accordance with the service context to a core network service of the respective set of core network services for the first service group.

Figure 12:
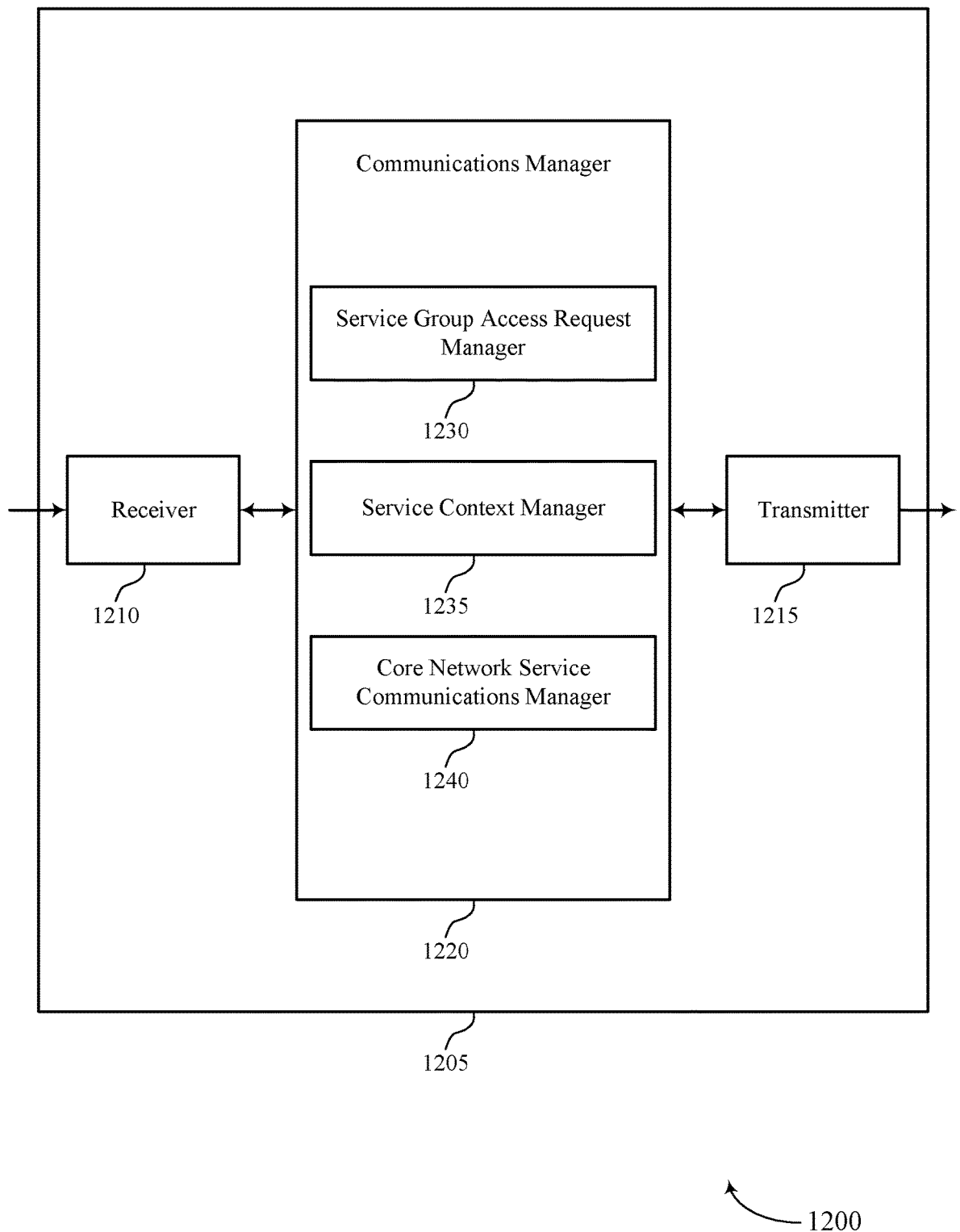

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, more efficient utilization of communication resources, FIG. 12 shows a block diagram 1200 of a device 1205 that supports service groups in a service-based wireless system in accordance with one or more aspects of the present disclosure. The device 1205 may be an example of aspects of a device 1105 or a DU 165 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of service groups in a service-based wireless system as described herein. For example, the communications manager 1220 may include a service group access request manager 1230, a service context manager 1235, a core network service communications manager 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a DU in accordance with examples as disclosed herein. The service group access request manager 1230 may be configured as or otherwise support a means for receiving, from a UE and, an access request indicating a first service group of a set of multiple service groups offered by a service-based network configured to interface with a RAN associated with the distributed unit, wherein each service group of the plurality of service groups includes a respective set of core network services, where each service group of the plurality of service groups is associated with a respective network credential for accessing the service group, and where the access request further indicates the respective network credential for the first service group. The service context manager 1235 may be configured as or otherwise support a means for transmitting, to the UE and in response to the access request, control information indicating a service context for communications between the UE and the respective set of core network services for the first service group. The core network service communications manager 1240 may be configured as or otherwise support a means for communicating a message received from the UE in accordance with the service context to a core network service of the respective set of core network services for the first service group.

Figure 13:
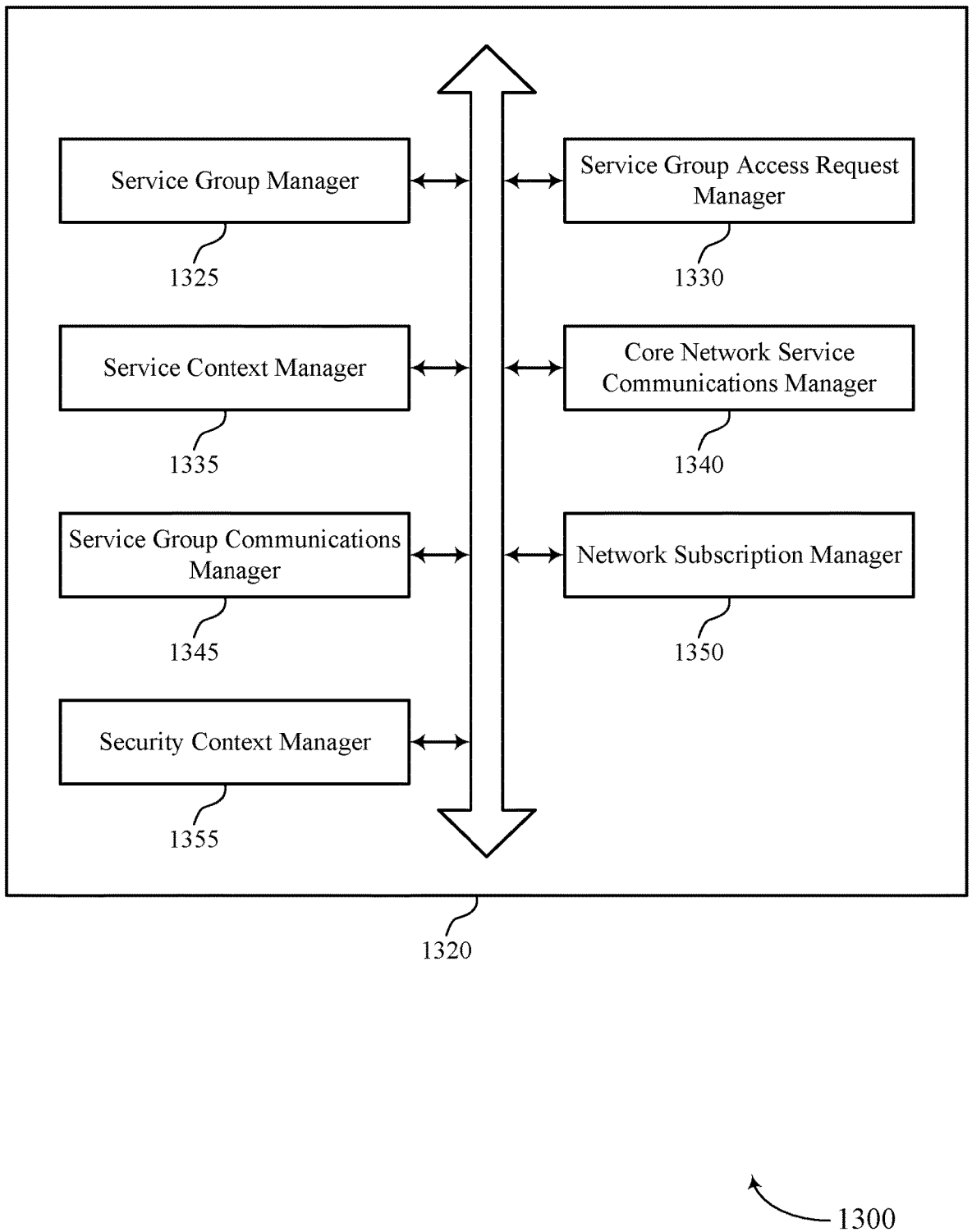
FIG. 13 shows a block diagram of a communications manager that supports service groups in a service-based wireless system in accordance with one or more aspects of the present disclosure.

FIG. 13 shows a block diagram 1300 of a communications manager 1320 that supports service groups in a service-based wireless system in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of service groups in a service-based wireless system as described herein. For example, the communications manager 1320 may include a service group manager 1325, a service group access request manager 1330, a service context manager 1335, a core network service communications manager 1340, a service group communications manager 1345, a network subscription manager 1350, a security context manager 1355, or any combination thereof. Each of these components may communicate, directly or indirectly, with one another (e.g., via one or more buses).

The communications manager 1320 may support wireless communications at a DU in accordance with examples as disclosed herein. The service group access request manager 1330 may be configured as or otherwise support a means for receiving, from a UE, an access request indicating a first service group of a set of multiple service groups offered by a service-based network configured to interface with a RAN associated with the distributed unit, wherein each service group of the plurality of service groups includes a respective set of core network services, where each service group of the plurality of service groups is associated with a respective network credential for accessing the service group, and where the access request further indicates the respective network credential for the first service group. The service context manager 1335 may be configured as or otherwise support a means for transmitting, to the UE and in response to the access request, control information indicating a service context for communications between the UE and the respective set of core network services for the first service group. The core network service communications manager 1340 may be configured as or otherwise support a means for communicating a message received from the UE in accordance with the service context to a core network service of the respective set of core network services for the first service group.

In some examples, the service context includes a master security context associated with the first service group. In some examples, a respective security context for each core network service included in the first service group is based on the master security context.

In some examples, the master security context includes authentication information, a key agreement, or both.

In some examples, to support communicating the message in accordance with the service context, the security context manager 1355 may be configured as or otherwise support a means for communicating the message in accordance with the respective security context for the core network service.

In some examples, the core network service communications manager 1340 may be configured as or otherwise support a means for communicating a second message received from the UE in accordance with the service context to a second core network service of the respective set of core network services.

In some examples, the core network service is configured to invoke a second core network service included in the first service group based on the message being communicated to the core network service.

In some examples, the core network service includes a data service. In some examples, the second core network service includes a mobility service.

In some examples, the service group access request manager 1330 may be configured as or otherwise support a means for receiving, from the UE, a second access request indicating a second service group of the set of multiple service groups and the respective network credential for the second service group. In some examples, the service context manager 1335 may be configured as or otherwise support a means for transmitting, to the UE and in response to the second access request, second control information indicating a second service context for communicating with the respective set of core network services for the second service group. In some examples, the core network service communications manager 1340 may be configured as or otherwise support a means for communicating a second message received from the UE in accordance with the second service context to a second core network service of the respective set of core network services included in the second service group.

In some examples, the second core network service is configured to invoke a third core network service included in the first service group based on the second message being communicated to the second core network service.

In some examples, the second core network service includes a data service, and the third core network service includes a mobility service.

In some examples, the first service group does not communicate with the second service group.

In some examples, the service group manager 1325 may be configured as or otherwise support a means for transmitting, to the UE, second control information indicating the set of multiple of service groups, where the second control information indicates, for each service group of the set of multiple service groups, the respective set of core network services included in the service group and the respective network credential for accessing the service group.

In some examples, to support transmitting the second control information, the service group communications manager 1345 may be configured as or otherwise support a means for transmitting an indication of whether each service group of the set of multiple service groups is capable of communication with one or more other service groups of the set of multiple service groups.

In some examples, to support transmitting the second control information, the network subscription manager 1350 may be configured as or otherwise support a means for transmitting an indication of a respective network subscription associated with each of the set of multiple service groups, where receiving the access request is based on the respective network subscription associated with the first service group.

In some examples, the service context includes a radio access network configuration for communicating with the UE as part of using the core network service.

In some examples, each core network service of the respective set of core network services is associated with a respective API of a set of multiple APIs.

In some examples, the respective set of core network services include a mobility service, a connection state management service, a security service, a paging service, a radio access service, a data service, a capability management service, a location service, a messaging service, or any combination thereof.

Figure 14:
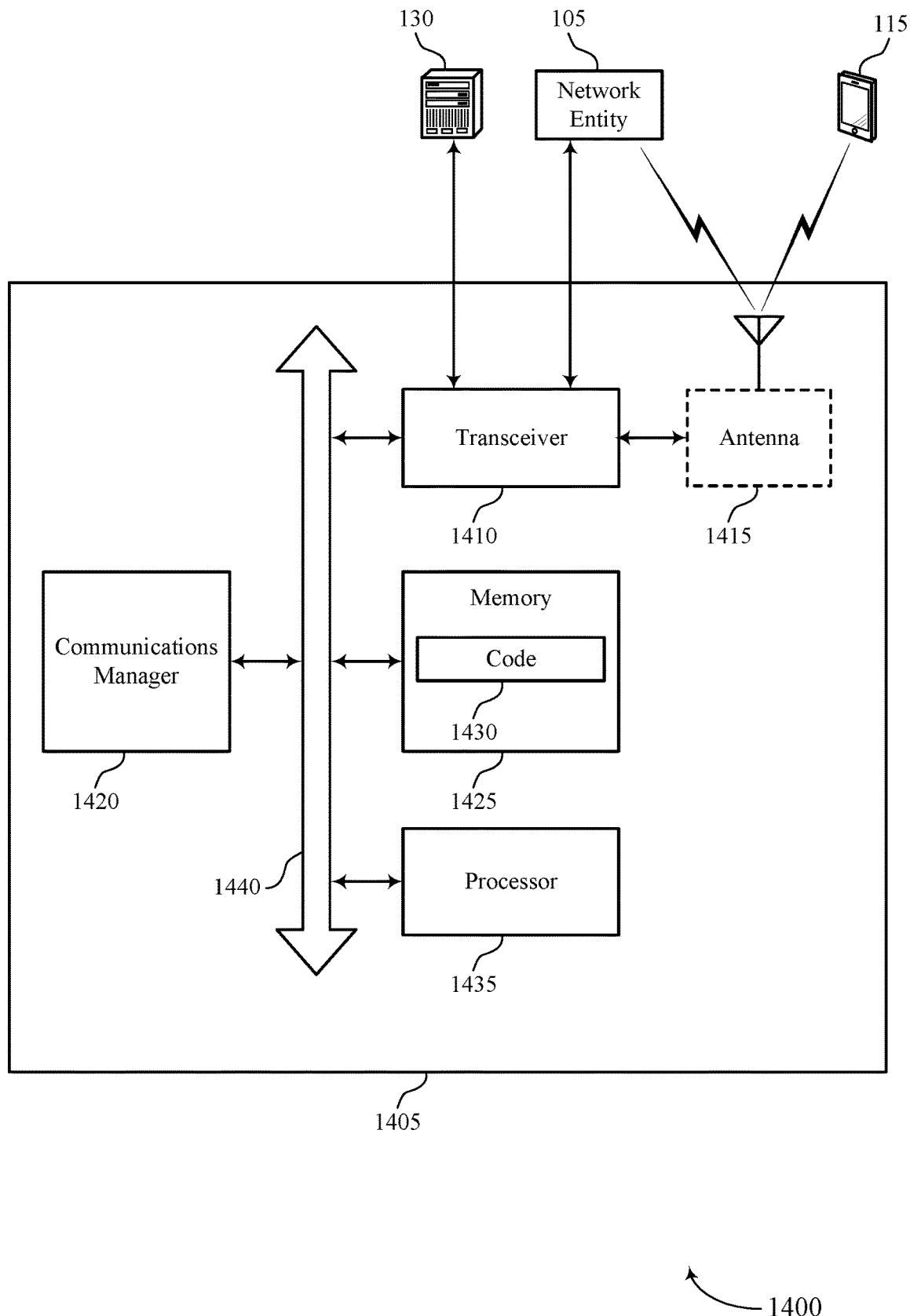
FIG. 14 shows a diagram of a system including a device that supports service groups in a service-based wireless system in accordance with one or more aspects of the present disclosure.

FIG. 14 shows a diagram of a system 1400 including a device 1405 that supports service groups in a service-based wireless system in accordance with one or more aspects of the present disclosure. The device 1405 may be an example of or include the components of a device 1105, a device 1205, or a DU 165 as described herein. The device 1405 may include components for bi-directional voice and data communications including components for transmitting and receiving communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting service groups in a service-based wireless system). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405 and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a service-based network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105 and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a DU in accordance with examples as disclosed herein. The communications manager 1420 may be configured as or otherwise support a means for receiving, from a UE, an access request indicating a first service group of a set of multiple service groups offered by a service-based network configured to interface with a RAN associated with the distributed unit, wherein each service group of the plurality of service groups includes a respective set of core network services, where each service group of the plurality of service groups is associated with a respective network credential for accessing the service group, and where the access request further indicates the respective network credential for the first service group. The communications manager 1420 may be configured as or otherwise support a means for transmitting, to the UE and in response to the access request, control information indicating a service context for communications between the UE and the respective set of core network services for the first service group. The communications manager 1420 may be configured as or otherwise support a means for communicating a message received from the UE in accordance with the service context to a core network service of the respective set of core network services for the first service group.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of service groups in a service-based wireless system as described herein, or the processor 1435 and the memory 1425 may be otherwise configured to perform or support such operations.

Figure 15:
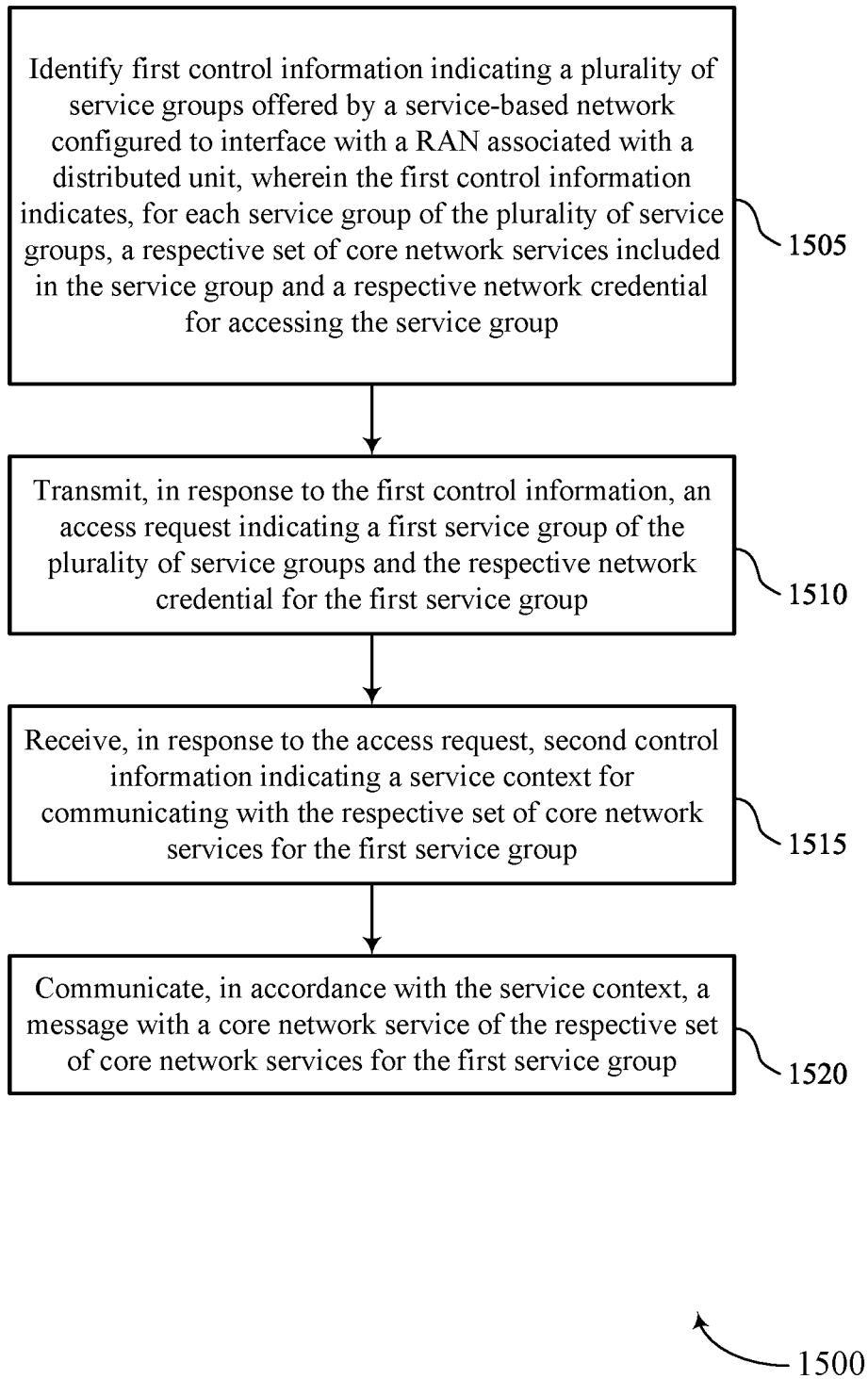
FIGS. 15 through 18 show flowcharts illustrating methods that support service groups in a service-based wireless system in accordance with one or more aspects of the present disclosure.

FIG. 15 shows a flowchart illustrating a method 1500 that supports service groups in a service-based wireless system in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include identifying first control information indicating a plurality of service groups offered by a service-based network configured to interface with a RAN associated with a DU, where the first control information indicates, for each service group of the plurality of service groups, a respective set of core network services included in the service group and a respective network credential for accessing the service group. The operations of 1505 may be performed in accordance with examples as disclosed herein. In some examples, aspects of the operations of 1505 may be performed by a service group manager 925 as described with reference to FIG. 9.

At 1510, the method may include transmitting, in response to the first control information, an access request indicating a first service group of the plurality of service groups and the respective network credential for the first service group. The operations of 1510 may be performed in accordance with examples as disclosed herein. In some examples, aspects of the operations of 1510 may be performed by a service group access request manager 930 as described with reference to FIG. 9.

At 1515, the method may include receiving, in response to the access request, second control information indicating a service context for communicating with the respective set of core network services for the first service group. The operations of 1515 may be performed in accordance with examples as disclosed herein. In some examples, aspects of the operations of 1515 may be performed by a service context manager 935 as described with reference to FIG. 9.

At 1520, the method may include communicating, in accordance with the service context, a message with a core network service of the respective set of core network services for the first service group. The operations of 1520 may be performed in accordance with examples as disclosed herein. In some examples, aspects of the operations of 1520 may be performed by a core network service communications manager 940 as described with reference to FIG. 9.

Figure 16:
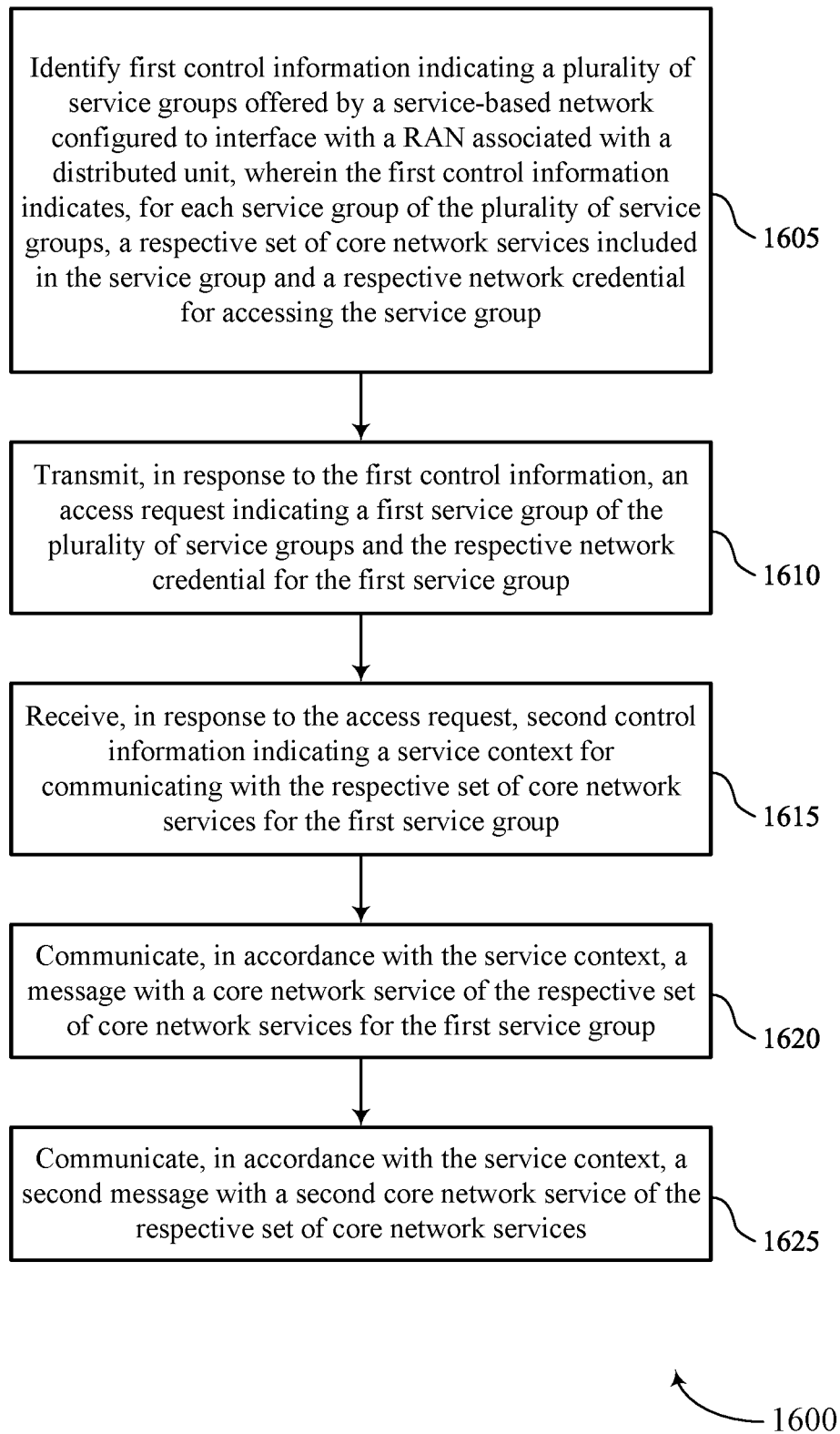

FIG. 16 shows a flowchart illustrating a method 1600 that supports service groups in a service-based wireless system in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include identifying first control information indicating a plurality of service groups offered by a service-based network configured to interface with a RAN associated with a DU, where the first control information indicates, for each service group of the plurality of service groups, a respective set of core network services included in the service group and a respective network credential for accessing the service group. The operations of 1605 may be performed in accordance with examples as disclosed herein. In some examples, aspects of the operations of 1605 may be performed by a service group manager 925 as described with reference to FIG. 9.

At 1610, the method may include transmitting, in response to the first control information, an access request indicating a first service group of the plurality of service groups and the respective network credential for the first service group. The operations of 1610 may be performed in accordance with examples as disclosed herein. In some examples, aspects of the operations of 1610 may be performed by a service group access request manager 930 as described with reference to FIG. 9.

At 1615, the method may include receiving, in response to the access request, second control information indicating a service context for communicating with the respective set of core network services for the first service group. The operations of 1615 may be performed in accordance with examples as disclosed herein. In some examples, aspects of the operations of 1615 may be performed by a service context manager 935 as described with reference to FIG. 9.

At 1620, the method may include communicating, in accordance with the service context, a message with a core network service of the respective set of core network services for the first service group. The operations of 1620 may be performed in accordance with examples as disclosed herein. In some examples, aspects of the operations of 1620 may be performed by a core network service communications manager 940 as described with reference to FIG. 9.

At 1625, the method may include communicating, in accordance with the service context, a second message with a second core network service of the respective set of core network services. The operations of 1625 may be performed in accordance with examples as disclosed herein. In some examples, aspects of the operations of 1625 may be performed by a core network service communications manager 940 as described with reference to FIG. 9.

Figure 17:
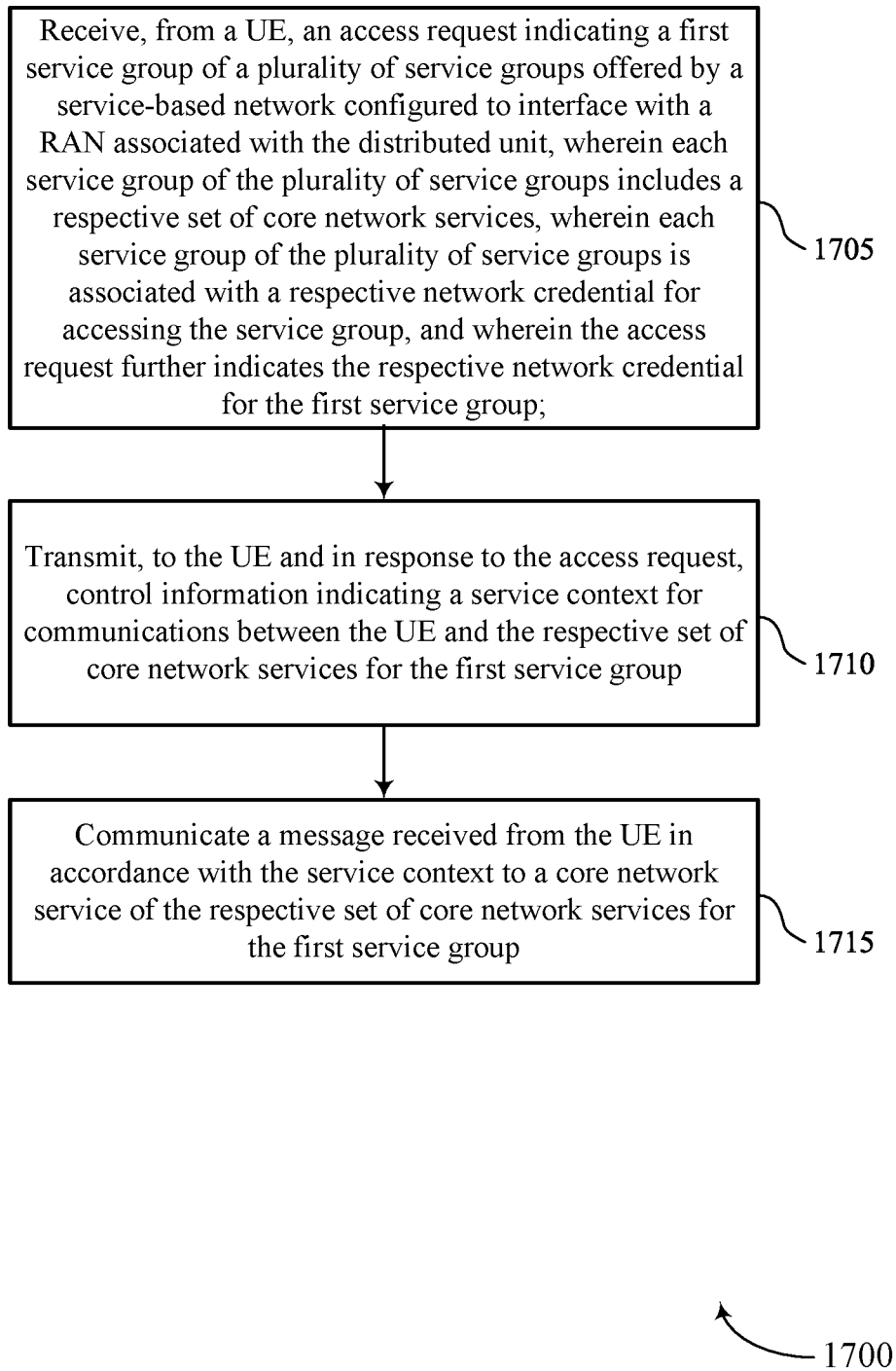

FIG. 17 shows a flowchart illustrating a method 1700 that supports service groups in a service-based wireless system in accordance with one or more aspects of the present disclosure. The operations of the method 1700 may be implemented by a DU 165 or its components as described herein. For example, the operations of the method 1700 may be performed by a DU 165 as described with reference to FIGS. 1 through 6 and 11 through 14. In some examples, a DU 165 may execute a set of instructions to control the functional elements of the DU 165 to perform the described functions. Additionally, or alternatively, the DU 165 may perform aspects of the described functions using special-purpose hardware.

At 1705, the method may include receiving, from a UE, an access request indicating a first service group of a plurality of service groups offered by a service-based network configured to interface with a RAN associated with the DU, where each service group of the plurality of service groups includes a respective set of core network services, where each service group of the plurality of service groups is associated with a respective network credential for accessing the service group, and where the access request further indicates the respective network credential for the first service group. The operations of 1710 may be performed in accordance with examples as disclosed herein. In some examples, aspects of the operations of 1710 may be performed by a service group access request manager 1330 as described with reference to FIG. 13.

At 1710, the method may include transmitting, to the UE and in response to the access request, control information indicating a service context for communications between the UE and the respective set of core network services for the first service group. The operations of 1715 may be performed in accordance with examples as disclosed herein. In some examples, aspects of the operations of 1715 may be performed by a service context manager 1335 as described with reference to FIG. 13.

At 1715, the method may include communicating a message received from the UE in accordance with the service context to a core network service of the respective set of core network services for the first service group. The operations of 1720 may be performed in accordance with examples as disclosed herein. In some examples, aspects of the operations of 1720 may be performed by a core network service communications manager 1340 as described with reference to FIG. 13.

Figure 18:
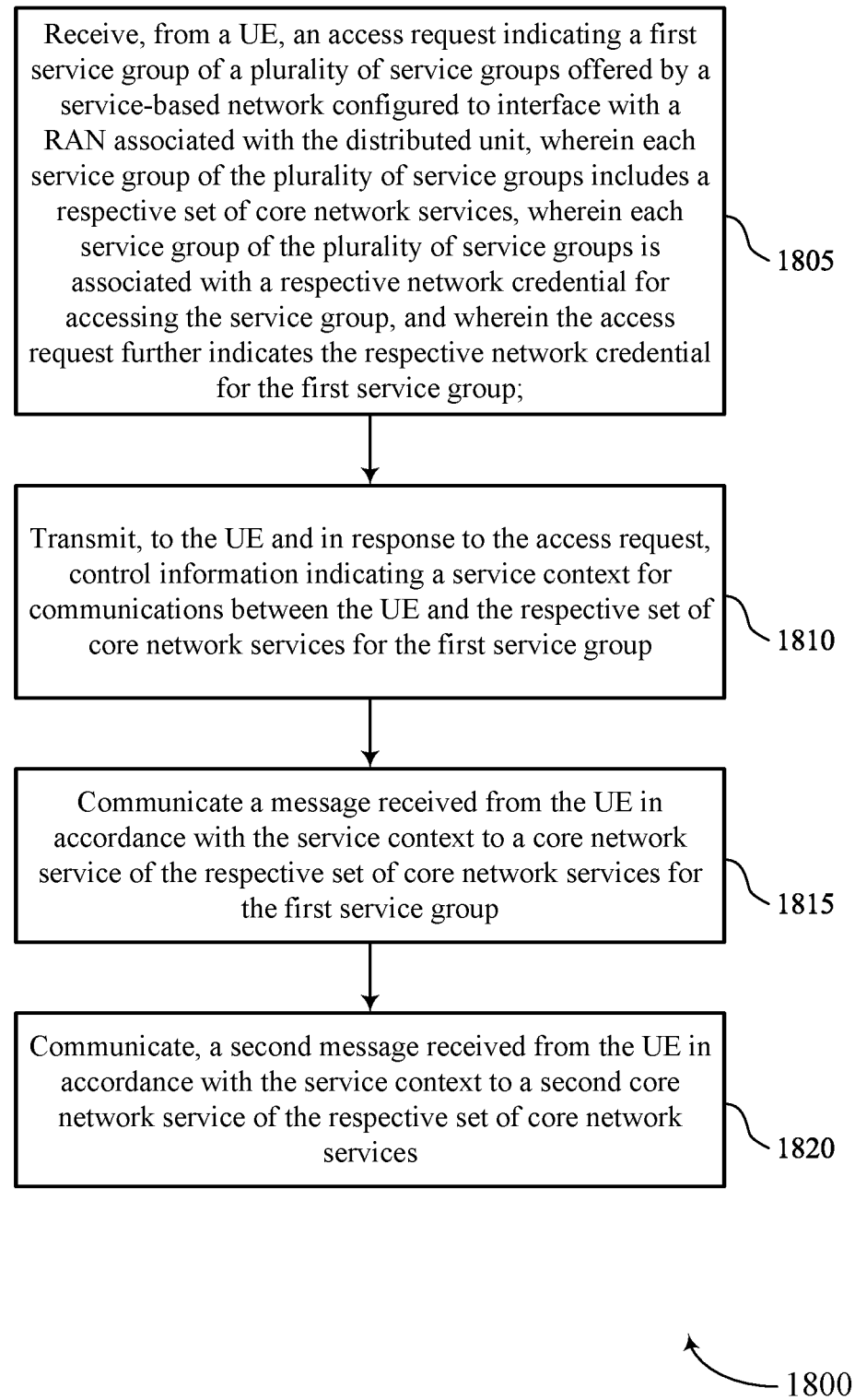

FIG. 18 shows a flowchart illustrating a method 1800 that supports service groups in a service-based wireless system in accordance with one or more aspects of the present disclosure. The operations of the method 1800 may be implemented by a DU 165 or its components as described herein. For example, the operations of the method 1800 may be performed by a DU 165 as described with reference to FIGS. 1 through 6 and 11 through 14. In some examples, a DU 165 may execute a set of instructions to control the functional elements of the DU 165 to perform the described functions. Additionally, or alternatively, the DU 165 may perform aspects of the described functions using special-purpose hardware.

At 1805, the method may include receiving, from a UE, an access request indicating a first service group of a plurality of service groups offered by a service-based network configured to interface with a RAN associated with the DU, where each service group of the plurality of service groups includes a respective set of core network services, where each service group of the plurality of service groups is associated with a respective network credential for accessing the service group, and where the access request further indicates the respective network credential for the first service group. The operations of 1810 may be performed in accordance with examples as disclosed herein. In some examples, aspects of the operations of 1810 may be performed by a service group access request manager 1330 as described with reference to FIG. 13.

At 1810, the method may include transmitting, to the UE and in response to the access request, control information indicating a service context for communications between the UE and the respective set of core network services for the first service group. The operations of 1815 may be performed in accordance with examples as disclosed herein. In some examples, aspects of the operations of 1815 may be performed by a service context manager 1335 as described with reference to FIG. 13.

At 1815, the method may include communicating a message received from the UE in accordance with the service context to a core network service of the respective set of core network services for the first service group. The operations of 1820 may be performed in accordance with examples as disclosed herein. In some examples, aspects of the operations of 1820 may be performed by a core network service communications manager 1340 as described with reference to FIG. 13.

At 1820, the method may include communicating a second message received from the UE in accordance with the service context to a second core network service of the respective set of core network services. The operations of 1825 may be performed in accordance with examples as disclosed herein. In some examples, aspects of the operations of 1825 may be performed by a core network service communications manager 1340 as described with reference to FIG. 13. The following provides an overview of aspects of the present disclosure:

- Aspect 1: A method for wireless communication at a UE, comprising: identifying first control information indicating a plurality of service groups offered by a service-based network configured to interface with a RAN associated with a DU, wherein the first control information indicates, for each service group of the plurality of service groups, a respective set of core network services included in the service group and a respective network credential for accessing the service group; transmitting, in response to the first control information, an access request indicating a first service group of the plurality of service groups and the respective network credential for the first service group; receiving, in response to the access request, second control information indicating a service context for communicating with the respective set of core network services for the first service group; and communicating, in accordance with the service context, a message with a core network service of the respective set of core network services for the first service group.
- Aspect 2: The method of aspect 1, wherein the service context comprises a master security context associated with the first service group, the method further comprising: determining a respective security context for each core network service included in the first service group based on the master security context.
- Aspect 3: The method of aspect 2, wherein communicating the message in accordance with the service context comprises: communicating the message in accordance with the determined respective security context for the core network service.
- Aspect 4: The method of any of aspects 2 through 3, wherein the master security context comprises authentication information, a key agreement, or both.
- Aspect 5: The method of any of aspects 1 through 4, further comprising: communicating, in accordance with the service context, a second message with a second core network service of the respective set of core network services.
- Aspect 6: The method of any of aspects 1 through 5, wherein the core network service is configured to invoke a second core network service included in the first service group based at least in part on the message being communicated with the core network service.
- Aspect 7: The method of aspect 6, wherein the core network service comprises a data service, and the second core network service comprises a mobility service.
- Aspect 8: The method of any of aspects 1 through 7, further comprising: transmitting, in response to the first control information, a second access request indicating a second service group of the plurality of service groups and the respective network credential for the second service group; receiving, in response to the second access request, third control information indicating a second service context for communicating with the respective set of core network services for the second service group; and communicating, in accordance with the second service context, a second message with a second core network service of the respective set of core network services included in the second service group.
- Aspect 9: The method of aspect 8, wherein the second core network service is configured to invoke a third core network service included in the first service group based at least in part on the second message being communicated with the second core network service.
- Aspect 10: The method of aspect 9, wherein the second core network service comprises a data service, and the third core network service comprises a mobility service.
- Aspect 11: The method of any of aspects 8 through 10, wherein identifying the first control information comprises: determining that the first service group does not communicate with the second service group, wherein transmitting the second access request is based on the determining that the first service group does not communicate with the second service group.
- Aspect 12: The method of any of aspects 1 through 11, wherein identifying the first control information comprises: identifying whether each service group of the plurality of service groups is capable of communication with one or more other service groups of the plurality of service groups.
- Aspect 13: The method of any of aspects 1 through 12, wherein identifying the first control information comprises: identifying a respective network subscription associated with each of the plurality of service groups, wherein transmitting the access request is based on the respective network subscription associated with the first service group.
- Aspect 14: The method of any of aspects 1 through 13, wherein the service context comprises a radio access network configuration for communicating with the DU as part of using the core network service.
- Aspect 15: The method of any of aspects 1 through 14, wherein the access request, the message, or both, are transmitted to the DU for relay to a network address associated with the core network service.

Aspect 16: The method of any of aspects 1 through 15, wherein each core network service of the respective set of core network services is associated with a respective application programming interface of a plurality of application programming interfaces.

Aspect 17: The method of any of aspects 1 through 16, wherein the respective set of core network services comprise a mobility service, a connection state management service, a security service, a paging service, a radio access service, a data service, a capability management service, a location service, a messaging service, or any combination thereof Aspect 18: The method of any of aspects 1 through 17, wherein identifying the first control information comprises: receiving the first control information via a wireless connection between the UE and the DU.

Aspect 19: The method of any of aspects 1 through 17, wherein identifying the first control information comprises: accessing the first control information from local storage at the UE.

Aspect 20: A method for wireless communications at a DU, comprising: receiving, from a UE, an access request indicating a first service group of a plurality of service groups offered by a service-based network configured to interface with a RAN associated with the DU, wherein each service group of the plurality of service groups includes a respective set of core network services, wherein each service group of the plurality of service groups is associated with a respective network credential for accessing the service group, and wherein the access request further indicates the respective network credential for the first service group; transmitting, to the UE and in response to the access request, control information indicating a service context for communications between the UE and the respective set of core network services for the first service group; and communicating a message received from the UE in accordance with the service context to a core network service of the respective set of core network services for the first service group.

Aspect 21: The method of aspect 20, wherein the service context comprises a master security context associated with the first service group, and a respective security context for each core network service included in the first service group is based on the master security context.

Aspect 22: The method of aspect 21, wherein the master security context comprises authentication information, a key agreement, or both.

Aspect 23: The method of any of aspects 21 through 22, wherein communicating the message in accordance with the service context comprises: communicating the message in accordance with the respective security context for the core network service.

Aspect 24: The method of any of aspects 20 through 23, further comprising: communicating a second message received from the UE in accordance with the service context to a second core network service of the respective set of core network services.

Aspect 25: The method of any of aspects 20 through 24, wherein the core network service is configured to invoke a second core network service included in the first service group based at least in part on the message being communicated to the core network service.

Aspect 26: The method of aspect 25, wherein the core network service comprises a data service, and the second core network service comprises a mobility service.

Aspect 27: The method of any of aspects 20 through 26, further comprising: receiving, from the UE, a second access request indicating a second service group of the plurality of service groups and the respective network credential for the second service group; transmitting, to the UE and in response to the second access request, second control information indicating a second service context for communicating with the respective set of core network services for the second service group; and communicating a second message received from the UE in accordance with the second service context to a second core network service of the respective set of core network services included in the second service group.

Aspect 28: The method of aspect 27, wherein the second core network service is configured to invoke a third core network service included in the first service group based at least in part on the second message being communicated to the second core network service.

Aspect 29: The method of aspect 28, wherein the second core network service comprises a data service, and the third core network service comprises a mobility service.

Aspect 30: The method of any of aspects 27 through 29, wherein the first service group does not communicate with the second service group.

Aspect 31: The method of any of aspects 20 through 30, further comprising: transmitting, to the UE, second control information indicating the plurality of service groups, wherein the second control information indicates, for each service group of the plurality of service groups, the respective set of core network services included in the service group and the respective network credential for accessing the service group.

Aspect 32: The method of aspect 31, wherein transmitting the second control information comprises: transmitting an indication of whether each service group of the plurality of service groups is capable of communication with one or more other service groups of the plurality of service groups.

Aspect 33: The method of any of aspects 31 through 32, wherein transmitting the second control information comprises: transmitting an indication of a respective network subscription associated with each of the plurality of service groups, wherein receiving the access request is based on the respective network subscription associated with the first service group.

Aspect 34: The method of any of aspects 20 through 33, wherein the service context comprises a radio access network configuration for communicating with the UE as part of using the core network service.

Aspect 35: The method of any of aspects 20 through 34, wherein each core network service of the respective set of core network services is associated with a respective application programming interface of a plurality of application programming interfaces.

Aspect 36: The method of any of aspects 20 through 34, wherein the respective set of core network services comprise a mobility service, a connection state management service, a security service, a paging service, a radio access service, a data service, a capability management service, a location service, a messaging service, or any combination thereof Aspect 37: An apparatus for wireless communication at a UE, comprising a processor; memory coupled with the processor; and instructions stored in the memory and executable by the processor to cause the apparatus to perform a method of any of aspects 1 through 19.

Aspect 38: An apparatus for wireless communication at a UE, comprising at least one means for performing a method of any of aspects 1 through 19.

Aspect 39: A non-transitory computer-readable medium storing code for wireless communication at a UE, the code comprising instructions executable by a processor to perform a method of any of aspects 1 through 19.

Aspect 40: An apparatus for wireless communications at a DU, comprising a processor; memory coupled with the processor; and instructions stored in the memory and executable by the processor to cause the apparatus to perform a method of any of aspects 20 through 36.

Aspect 41: An apparatus for wireless communications at a DU, comprising at least one means for performing a method of any of aspects 20 through 36.

Aspect 42: A non-transitory computer-readable medium storing code for wireless communications at a DU, the code comprising instructions executable by a processor to perform a method of any of aspects 20 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   identifying first control information indicating a plurality of service groups offered by a service-based network configured to interface with a radio access network (RAN) associated with a distributed unit, wherein the first control information indicates, for each service group of the plurality of service groups, a respective set of core network services included in the service group and a respective network credential for accessing the service group;
   transmitting, in response to the first control information, an access request indicating a first service group of the plurality of service groups and the respective network credential for the first service group;
   receiving, in response to the access request, second control information indicating a service context for communicating with the respective set of core network services for the first service group; and
   communicating, in accordance with the service context, a message with a core network service of the respective set of core network services for the first service group.

2. The method of claim 1, wherein the service context comprises a master security context associated with the first service group, the method further comprising:
   determining a respective security context for each core network service included in the first service group based on the master security context.

3. The method of claim 1, further comprising:
   communicating, in accordance with the service context, a second message with a second core network service of the respective set of core network services.

4. The method of claim 1, wherein the core network service is configured to invoke a second core network service included in the first service group based at least in part on the message being communicated with the core network service.

5. The method of claim 4, wherein:
   the core network service comprises a data service, and
   the second core network service comprises a mobility service.

6. The method of claim 1, further comprising:
   transmitting, in response to the first control information, a second access request indicating a second service group of the plurality of service groups and the respective network credential for the second service group;
   receiving, in response to the second access request, third control information indicating a second service context for communicating with the respective set of core network services for the second service group; and
   communicating, in accordance with the second service context, a second message with a second core network service of the respective set of core network services included in the second service group.

7. The method of claim 6, wherein the second core network service is configured to invoke a third core network service included in the first service group based at least in part on the second message being communicated with the second core network service.

8. The method of claim 6, wherein identifying the first control information comprises:
   determining that the first service group does not communicate with the second service group, wherein transmitting the second access request is based on the determining that the first service group does not communicate with the second service group.

9. The method of claim 1, wherein identifying the first control information comprises:
   identifying a respective network subscription associated with each of the plurality of service groups, wherein transmitting the access request is based on the respective network subscription associated with the first service group.

10. The method of claim 1, wherein the service context comprises a radio access network configuration for communicating with the distributed unit as part of using the core network service.

11. The method of claim 1, wherein the access request, the message, or both, are transmitted to the distributed unit for relay to a network address associated with the core network service.

12. The method of claim 1, wherein each core network service of the respective set of core network services is associated with a respective application programming interface of a plurality of application programming interfaces.

13. The method of claim 1, wherein the respective set of core network services comprise a mobility service, a connection state management service, a security service, a paging service, a radio access service, a data service, a capability management service, a location service, a messaging service, or any combination thereof.

14. The method of claim 1, wherein identifying the first control information comprises:
   receiving the first control information via a wireless connection between the UE and the distributed unit.

15. The method of claim 1, wherein identifying the first control information comprises:
   accessing the first control information from local storage at the UE.

16. A method for wireless communications at a distributed unit, comprising:
   receiving, from a user equipment (UE), an access request indicating a first service group of a plurality of service groups offered by a service-based network configured to interface with a radio access network (RAN) associated with the distributed unit, wherein each service group of the plurality of service groups includes a respective set of core network services, wherein each service group of the plurality of service groups is associated with a respective network credential for accessing the service group, and wherein the access request further indicates the respective network credential for the first service group;

transmitting, to the UE and in response to the access request, control information indicating a service context for communications between the UE and the respective set of core network services for the first service group; and communicating a message received from the UE in accordance with the service context to a core network service of the respective set of core network services for the first service group.

17. The method of claim 16, wherein:
the service context comprises a master security context associated with the first service group, and
a respective security context for each core network service included in the first service group is based on the master security context.

18. The method of claim 16, further comprising:
communicating a second message received from the UE in accordance with the service context to a second core network service of the respective set of core network services.

19. The method of claim 16, wherein the core network service is configured to invoke a second core network service included in the first service group based at least in part on the message being communicated to the core network service.

20. The method of claim 19, wherein:
the core network service comprises a data service, and
the second core network service comprises a mobility service.

21. The method of claim 16, further comprising:
receiving, from the UE, a second access request indicating a second service group of the plurality of service groups and the respective network credential for the second service group;
transmitting, to the UE and in response to the second access request, second control information indicating a second service context for communicating with the respective set of core network services for the second service group; and
communicating a second message received from the UE in accordance with the second service context to a second core network service of the respective set of core network services included in the second service group.

22. The method of claim 21, wherein the second core network service is configured to invoke a third core network service included in the first service group based at least in part on the second message being communicated to the second core network service.

23. The method of claim 16, further comprising:
transmitting, to the UE, second control information indicating the plurality of service groups, wherein the second control information indicates, for each service group of the plurality of service groups, the respective set of core network services included in the service group and the respective network credential for accessing the service group.

24. The method of claim 23, wherein transmitting the second control information comprises:
transmitting an indication of whether each service group of the plurality of service groups is capable of communication with one or more other service groups of the plurality of service groups.

25. The method of claim 23, wherein transmitting the second control information comprises:
transmitting an indication of a respective network subscription associated with each of the plurality of service groups, wherein receiving the access request is based on the respective network subscription associated with the first service group.

26. The method of claim 16, wherein the service context comprises a radio access network configuration for communicating with the UE as part of using the core network service.

27. The method of claim 16, wherein each core network service of the respective set of core network services is associated with a respective application programming interface of a plurality of application programming interfaces.

28. The method of claim 16, wherein the respective set of core network services comprise a mobility service, a connection state management service, a security service, a paging service, a radio access service, a data service, a capability management service, a location service, a messaging service, or any combination thereof.

29. An apparatus for wireless communication at a user equipment (UE), comprising:
a processor; and
a memory coupled with the processor, wherein the memory comprises instructions executable by the processor to cause the apparatus to:
identify first control information indicating a plurality of service groups offered by a service-based network configured to interface with a radio access network (RAN) associated with a distributed unit, wherein the first control information indicates, for each service group of the plurality of service groups, a respective set of core network services included in the service group and a respective network credential for accessing the service group;
transmit, in response to the first control information, an access request indicating a first service group of the plurality of service groups and the respective network credential for the first service group;
receive, in response to the access request, second control information indicating a service context for communicating with the respective set of core network services for the first service group; and
communicate, in accordance with the service context, a message with a core network service of the respective set of core network services for the first service group.

30. An apparatus for wireless communications at a distributed unit, comprising:
a processor; and
a memory coupled with the processor, wherein the memory comprises instructions executable by the processor to cause the apparatus to:
receive, from a user equipment (UE), an access request indicating a first service group of a plurality of service groups offered by a service-based network configured to interface with a radio access network (RAN) associated with the distributed unit, wherein each service group of the plurality of service groups includes a respective set of core network services, wherein each service group of the plurality of service groups is associated with a respective network credential for accessing the service group, and wherein the access request further indicates the respective network credential for the first service group;

transmit, to the UE and in response to the access request, control information indicating a service context for communications between the UE and the respective set of core network services for the first service group; and communicate a message received from the UE in accordance with the service context to a core network service of the respective set of core network services for the first service group.

* * * * *